(12) United States Patent
Yamamoto

(10) Patent No.: US 11,053,882 B2
(45) Date of Patent: Jul. 6, 2021

(54) FUEL INJECTION VALVE CONTROL DEVICE AND FUEL INJECTION VALVE CONTROL METHOD

(71) Applicant: DENSO CORPORATION, Kariya (JP)

(72) Inventor: Takamasa Yamamoto, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/855,088

(22) Filed: Apr. 22, 2020

(65) Prior Publication Data

US 2020/0248642 A1    Aug. 6, 2020

Related U.S. Application Data

(63) Continuation of application No. PCT/JP2018/039517, filed on Oct. 24, 2018.

(30) Foreign Application Priority Data

Oct. 31, 2017   (JP) .............................. JP2017-210293

(51) Int. Cl.
*F02D 41/34*   (2006.01)
*F02D 41/30*   (2006.01)
*H02P 29/40*   (2016.01)

(52) U.S. Cl.
CPC ......... *F02D 41/34* (2013.01); *F02D 41/3005* (2013.01); *H02P 29/40* (2016.02)

(58) Field of Classification Search
CPC ................. F02D 41/34; F02D 41/3005; F02D 2041/2017; F02D 41/20; F02D 41/3818; F02D 2041/389; F02D 41/221; F02D 2041/224; F02D 2041/2003; H02P 29/40; F02M 51/00; F02M 51/06
See application file for complete search history.

(56) References Cited

U.S. PATENT DOCUMENTS

| | | | | |
|---|---|---|---|---|
| 6,571,773 | B1* | 6/2003 | Yamakado | F02D 41/20 123/486 |
| 2002/0014223 | A1 | 2/2002 | Marceca et al. | |
| 2008/0319584 | A1 | 12/2008 | Fischer et al. | |
| 2012/0216783 | A1* | 8/2012 | Kusakabe | F02D 41/20 123/490 |
| 2017/0306907 | A1* | 10/2017 | Namuduri | H02K 33/16 |
| 2017/0335789 | A1* | 11/2017 | Kiuchi | F02D 41/062 |
| 2018/0209373 | A1* | 7/2018 | Yoshiume | F02M 61/10 |

FOREIGN PATENT DOCUMENTS

JP    2016-196893    11/2016

* cited by examiner

*Primary Examiner* — Joseph J Dallo
(74) *Attorney, Agent, or Firm* — Nixon & Vanderhye P.C.

(57) ABSTRACT

An increase control unit causes to apply a first voltage to a coil of a fuel injection valve to increase a driving current of the coil to a peak value. A holding control unit stops application of the first voltage, when the driving current increases to the peak value, and subsequently switches between a first holding control and a second holding control. The first holding control is to apply a second voltage lower than the first voltage to the coil based on at least one of the peak value, the second voltage, and a fuel pressure, to hold the driving current at a target current. The second holding control is to apply the first voltage to the coil to hold the driving current at the target current. The holding control unit performs one of the first holding control and the second holding control which is switched.

12 Claims, 18 Drawing Sheets ical Patent Application No. PCT/JP2018/039517
FUEL INJECTION VALVE CONTROL DEVICE AND FUEL INJECTION VALVE CONTROL METHOD

CROSS REFERENCE TO RELATED APPLICATION

The present application is a continuation application of International Patent Application No. PCT/JP2018/039517 filed on Oct. 24, 2018, which designated the U.S. and claims the benefit of priority from Japanese Patent Application No. 2017-210293 filed on Oct. 31, 2017. The entire disclosures of all of the above applications are incorporated herein by reference.

TECHNICAL FIELD

The present disclosure relates to a control device to control a fuel injection valve.

BACKGROUND

Conventionally, a control device applies a voltage to a coil of a fuel injection valve for an internal combustion engine to drive a valve element of the fuel injection valve.

SUMMARY

According to one aspect of the present disclosure, a fuel injection valve control device is configured to drive a fuel injection valve with a driving circuit. The fuel injection valve includes a valve body to open/close an injection hole to inject fuel and a coil to act a force in a direction to open the injection hole of the valve body on energization. The driving circuit is configured to switch between a first voltage and a second voltage, which is lower than the first voltage, and to apply one of the first voltage and the second voltage which is switched to the coil.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
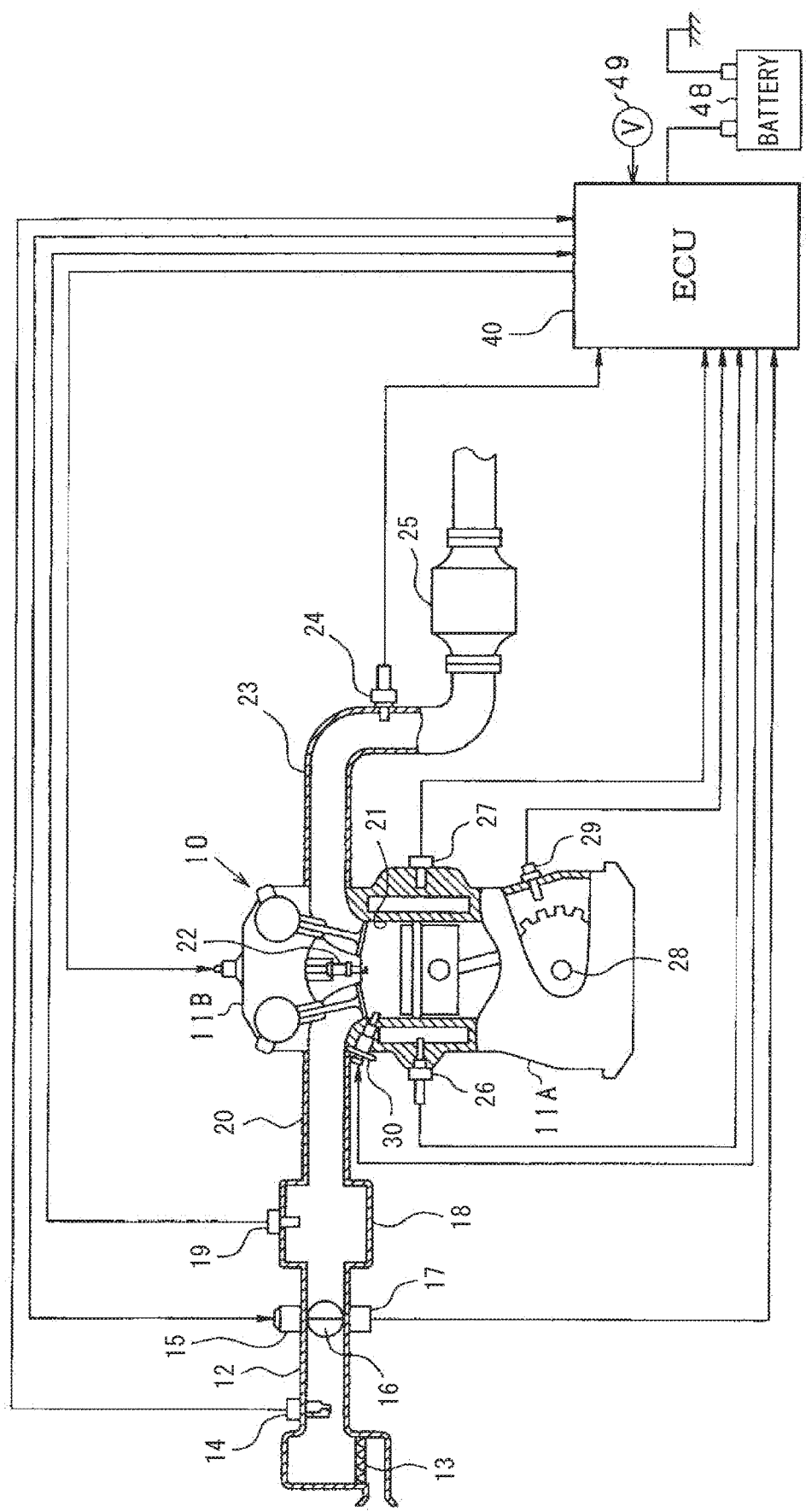
FIG. 1 is a diagram showing the schematic configuration of an engine control system.

Herein below, examples of the present disclosure will be described.

According to one example, a control device drives a fuel injection valve with a first voltage (high voltage) during an initial period. The control device subsequently drives the fuel injection valve with a battery voltage lower than the first voltage during a final period. In this example, movement of a valve body in a direction to open the injection hole of the fuel injection valve is started with the first voltage. The valve body is held at a target position with the battery voltage.

When an excessive driving current flows at the first voltage upon start of driving of the fuel injection valve, the operation of the valve body until the valve body is held at the target position could be unstable, or operation noise of the fuel injection valve could become large. Accordingly, it is assumable to set the driving current applied upon valve opening of the fuel injection valve at a minimum current.

However, the present inventor has paid attention to the fact that when a force to move the valve body in the direction to open an injection hole is small, e.g., when the driving current is small, upon switching of the voltage applied to the fuel injection valve to the battery voltage, the valve body could move to close the injection hole in some cases.

According to a first aspect, a fuel injection valve control device configured to drive a fuel injection valve, which includes a valve body to open/close an injection hole to inject fuel and a coil to act a force in a direction to open the injection hole of the valve body on energization, with a driving circuit that is configured to switch between a first voltage and a second voltage lower than the first voltage and to apply one of the first voltage and the second voltage which is switched to the coil. The fuel injection valve control device comprises an increase control unit configured to apply the first voltage with the driving circuit to the coil to increase a driving current that is an electric current to flow through the coil to a peak value. The fuel injection valve control device comprises a hold control unit configured: to stop application of the first voltage with the driving circuit when the increase control unit increases the driving current to the peak value; subsequently to switch between a first holding control to apply the second voltage with the driving circuit to the coil based on at least one of the peak value, the second voltage, and a fuel pressure, to hold the driving current at a target current, and a second holding control to apply the first voltage with the driving circuit to the coil to hold the driving current at the target current; and to perform one of the first holding control and the second holding control which is switched.

According to the above-described configuration, the increase control unit applies the first voltage with the driving circuit to the coil, to increase the driving current as a current which flows through the coil to the peak value. At this time, the coil, on energization, applies the force in the direction to open the injection hole to the valve body. Then the valve body is moved in the direction to open the injection hole.

Note that with the movement of the valve body in the direction to open the injection hole, a counter electromotive force occurs in the coil. The force to move the valve body in the direction to open the injection hole is weakened. Accordingly, the present inventor has paid attention to the fact that when the force to move the valve body in the direction to open the injection hole is small, e.g., when the peak value of the driving current is small, upon switching of the voltage applied to the fuel injection valve to the second voltage lower than the first voltage, the valve body moves to close the injection hole in some cases. The force to move the valve body in the direction to open the injection hole varies with the above-described peak value, the above-described second voltage, and fuel pressure.

In this respect, when the increase control unit increases the driving current to the peak value, the hold control unit stops application of the first voltage with the driving circuit. Thereafter, the hold control unit switches between the first holding control and the second holding control and performs one of the first holding control and the second holding control which is switched based on at least one of the peak value, the second voltage, and the fuel pressure, i.e., in correspondence with magnitude of the force to move the valve boy in the direction to open the injection hole. Accordingly, when the force to move the valve body in the direction to open the injection hole is small, the hold control unit switches to and performs the second holding control. The second holding control is to apply the first voltage with the driving circuit to the coil to hold the driving current at the target current. Accordingly, this configuration enables to restrict the driving current from becoming smaller than the target current, thus this configuration enables to restrict the valve body from moving toward the injection hole relative to the target position.

Thus, the fuel injection valve control device with the configuration may be capable of restricting the valve body from moving toward the injection hole from the target position even when the force to move the valve body in the direction to open the injection hole is small.

Further, when the force to move the valve body in the direction to open the injection hole is not small in the increase control, the hold control unit switches to and performs the first holding control. The first holding control is to apply the second voltage lower than the first voltage with the driving circuit to the coil, to hold the driving current at the target current. Accordingly, this configuration enables to restrict the driving current from becoming larger than the target current, thus this configuration enables to suppress power consumption with the coil.

Note that the peak value is not limited to the first peak value, but may be the second or third peak value. Control or the like to hold the driving current at an intermediate current smaller than the peak value and larger than the target current may be performed between the increase control and the holding control (the first holding control and the second holding control).

When the driving current which flows through the coil becomes smaller than the target current, the valve body may move to close the injection hole, or abnormality may be determined in abnormality determination of the fuel injection valve.

In this respect, in the second aspect, the hold control unit is configured to stop the application of the first voltage with the driving circuit, when the increase control unit increases the driving current to the peak value, subsequently switches between the first holding control and the second holding control and performs one of the first holding control and the second holding control which is switched based on at least one of the peak value, the second voltage, and the fuel pressure such that the driving current becomes larger than the minimum current set to be smaller than the target current. Accordingly, even when the peak value of the driving current is small, this configuration enables to avoid the situation where the driving current becomes smaller than the minimum current set to be smaller than the target current. Accordingly, when the valve body is held at the target position, this configuration enables to restrict the valve body from moving to close the injection hole or abnormality determination in the abnormality determination of the fuel injection valve.

In the third aspect, the peak value setting unit to set the peak value based on the fuel pressure is provided. The hold control unit stops the application of the first voltage with the driving circuit, when the increase control unit increases the driving current to the peak value. Subsequently, the hold control unit switches to and performs the second holding control, when the peak value set with the peak value setting unit is smaller than a predetermined current.

According to the above-described configuration, the peak value is set with the peak value setting unit based on the fuel pressure. Accordingly, this configuration enables to set the peak value appropriate to the fuel pressure, and this configuration enables to restrict the peak value from becoming an excessive value. However, as described above, when the peak value of the driving current is small, the force to move the valve body in the direction to open the injection hole becomes small. In some cases, upon switching of the voltage applied to the coil to the second voltage lower than the first voltage, the valve body moves to close the injection hole.

In this respect, the hold control unit stops the application of the first voltage with the driving circuit, when the increase control unit increases the driving current to the peak value. Subsequently, the hold control unit switches to and performs the second holding control, when the peak value set with the peak value setting unit is smaller than the predetermined current. Accordingly, this configuration enables to restrict the driving current from becoming smaller than the target current, thus this configuration enables to restrict the valve body from moving toward the injection hole relative to the target position.

When the second voltage is low, the increase rate of the driving circuit upon application of the second voltage to the coil is low, and the driving current which flows through the coil often becomes smaller than the target current.

In this respect, in the fourth aspect, the second voltage is supplied from a battery. When the increase control unit increases the driving current to the peak value, the hold control unit stops the application of the first voltage with the driving circuit. Subsequently, the hold control unit switches to and performs the second holding control, when the second voltage is lower than the predetermined voltage. Accordingly, when the second voltage supplied from the battery is lower than the predetermined voltage, this configuration enables to switch to and perform the second holding control, and this configuration enables to restrict the driving current from becoming smaller than the target current.

In the fifth aspect, the peak value setting unit to set the peak value based on the fuel pressure is provided. The second voltage is supplied from the battery. The hold control unit stops the application of the first voltage with the driving circuit, when the increase control unit increases the driving current to the peak value. Subsequently, the hold control unit switches to and performs the second holding control, when the peak value set with the peak value setting unit is smaller than the first predetermined current, or when the peak value set with the peak value setting unit is larger than the first predetermined current and is smaller than the second predetermined current larger than the first predetermined current and when the second voltage is lower than the predetermined voltage.

According to the above-described configuration, when the hold control unit stops the application of the first voltage subsequently when the peak value set with the peak value setting unit is smaller than the first predetermined current, the hold control unit switches to and performs the second holding control. Accordingly, even when the peak value of the driving current is smaller than the first predetermined current, this configuration enables to restrict the driving current from becoming smaller than the target current, thus this configuration enables to restrict the valve body from moving to the injection hold side from the target position. Further, when the peak value set with the peak value setting unit is larger than the first predetermined current and smaller than the second predetermined current larger than the first predetermined current, and the second voltage is lower than the predetermined voltage, the hold control unit also switches to and performs the second holding control. Accordingly, even when the peak value of the driving current is not larger than the second predetermined current larger than the first predetermined current, and the second voltage is lower than the predetermined voltage, this configuration enables to restrict the driving current from becoming smaller than the target current.

As described above, in a case where the peak value of the driving current is set based on the fuel pressure, when the peak value of the driving current is small, the force to move the valve body in the direction to open the injection hole becomes small. Accordingly, in some cases, upon switching of the voltage applied to the coil to the second voltage lower than the first voltage, the valve body moves to close the injection hole.

In this respect, in the sixth aspect, the hold control unit stops the application of the first voltage with the driving circuit, when the increase control unit increases the driving current to the peak value. Subsequently, the hold control unit switches to and performs the second holding control, when the fuel pressure is lower than the predetermined pressure. Accordingly, when the fuel pressure is lower than the predetermined pressure, i.e., when the peak value set with the peak value setting unit is smaller than the predetermined current, this configuration enables to switch to and perform the second holding control, and this configuration enables to restrict the driving current from becoming smaller than the target current.

As described above, with the movement of the valve body in the direction to open the injection hole, the counter electromotive force occurs in the coil, and the force to move the valve body in the direction to open the injection hole is weakened. Accordingly, during a period where the counter electromotive force occurs in the coil, the valve body often moves toward the injection hole from the target position.

In this respect, in the seventh aspect, the hold control unit stops the application of the first voltage with the driving circuit, when the increase control unit increases the driving current to the peak value. Subsequently the hold control unit starts the second holding control based on at least one of the peak value, the second voltage, and the fuel pressure. Subsequently the hold control unit continues the second holding control until occurrence of the counter electromotive force ceases in the coil. Subsequently, the hold control unit switches to and performs the first holding control, when occurrence of the counter electromotive force ceases in the coil. Accordingly, during the period where the counter electromotive force occurs in the coil, it is possible with the second holding control to restrict the valve body from moving to the injection hold side from the target position. Subsequently, the hold control unit switches to the first holding control, when occurrence of the counter electromotive force ceases in the coil, thus this configuration enables to suppress power consumption with the coil.

In the second holding control, as the driving current is held at the target current by application of the first voltage with the driving circuit to the coil, the variation range of the driving current often becomes large. When the variation range of the driving current becomes large, the operation of the valve body becomes unstable, thus the amount of fuel injection (injection rate) often varies.

In this respect, in the eighth aspect, under the first holding control, when the driving current is held at the target current, the hold control unit controls the variation range of the driving current within the predetermined variation range. Under the second holding control, when the driving current is held at the target current, the hold control unit controls the variation range of the driving current within the predetermined variation range. Accordingly, this configuration enables to make the variation range of the driving current in the second holding control equal to the variation range of the driving current in the first holding control. Further, this configuration enables to restrict the operation of the valve body from becoming unstable.

The ninth aspect is, a fuel injection valve control method to drive a fuel injection valve, which includes a valve body to open/close an injection hole to inject fuel and a coil to act a force in a direction to open the injection hole of the valve body on energization, with a driving circuit to switch between a first voltage and a second voltage lower than the first voltage and to apply one of the first voltage and the second voltage which is switched to the coil. The fuel injection valve control method comprises applying the first voltage with the driving circuit to the coil to increase a driving current that is an electric current to flow through the coil to a peak value. The fuel injection valve control method further comprises stopping application of the first voltage with the driving circuit when the driving current increases to the peak value. The fuel injection valve control method further comprises subsequently switching between a first holding control, which is to apply the second voltage with the driving circuit to the coil based on at least one of the peak value, the second voltage, and a fuel pressure, to hold the driving current at a target current, and a second holding control, which is to apply the first voltage with the driving circuit to the coil, to hold the driving current at the target current. The fuel injection valve control method further comprises performing one of the first holding control and the second holding control which is switched.

First Embodiment

Hereinbelow, a first embodiment will be described with reference to the drawings. The present embodiment is embodied as a control system to control a gasoline engine for a vehicle. First, the schematic configuration of the engine control system will be described based on FIG. 1.

An air cleaner 13 is provided in a top upstream part of an intake pipe 12 of an engine 10 as a cylinder injection type multi-cylinder internal combustion engine. An air flow meter 14 to detect an intake air amount is provided on the downstream side of the air cleaner 13. A throttle valve 16, the opening degree of which is adjusted with a motor 15, and a throttle opening degree sensor 17 to detect the opening degree (throttle opening degree) of the throttle valve 16 are provided on the downstream side of the air flow meter 14.

A surge tank 18 is provided on the downstream side of the throttle valve 16. The surge tank 18 is provided with an intake pipe pressure sensor 19 to detect an intake pipe pressure. An intake manifold 20 to introduce air into each cylinder 21 of the engine 10 is connected to the surge tank 18. An electromagnetic type fuel injection valve 30 to directly inject fuel into each cylinder is attached to each cylinder 21 of the engine 10. An ignition plug 22 is attached to a cylinder head 11B of the engine 10 by cylinder 21. With spark discharge with the ignition plug 22 of each cylinder 21, air-fuel mixture in the cylinder is ignited.

An exhaust pipe 23 of the engine 10 is provided with an exhaust gas sensor 24 (an air-fuel ratio sensor, an oxygen sensor, or the like) to detect an air-fuel ratio or a rich/lean air-fuel ratio of the air-fuel mixture based on exhaust gas. A catalyst 25 such as a three-way catalyst to purify the exhaust gas is provided on the downstream side of the exhaust gas sensor 24.

A cooling water temperature sensor 26 to detect a cooling water temperature and a knock sensor 27 to detect knocking are attached to a cylinder block 11A of the engine 10. A crank angle sensor 29 to output a pulse signal each time a crank shaft 28 rotates at a predetermined crank angle is attached to the outer peripheral side of the crank shaft 28. The crank angle and an engine speed are detected based on a crank angle signal from the crank angle sensor 29.

The outputs from the various sensors are inputted into an ECU 40. The ECU 40 is an electronic control unit mainly including a microcomputer. The ECU 40 performs various types of control of the engine 10 using detection signals from the various sensors. The ECU 40 computes a fuel injection amount corresponding to engine operating status, to control fuel injection of the fuel injection valve 30, and to control ignition timing of the ignition plug 22. Further, the ECU 40 controls fuel pressure based on the fuel injection amount. A battery 48 is connected to the ECU 40. A voltage sensor 49 detects voltage of the battery 48, and outputs a detection signal to the ECU 40. The battery 48 is, for example, a lead storage battery to supply a low voltage V2 (the second voltage) of e.g. 12 V. Note that the battery 48 is not limited to the lead storage battery, and may be an NiH battery, a Li ion battery, or the like to supply the low voltage V2.

Figure 2:
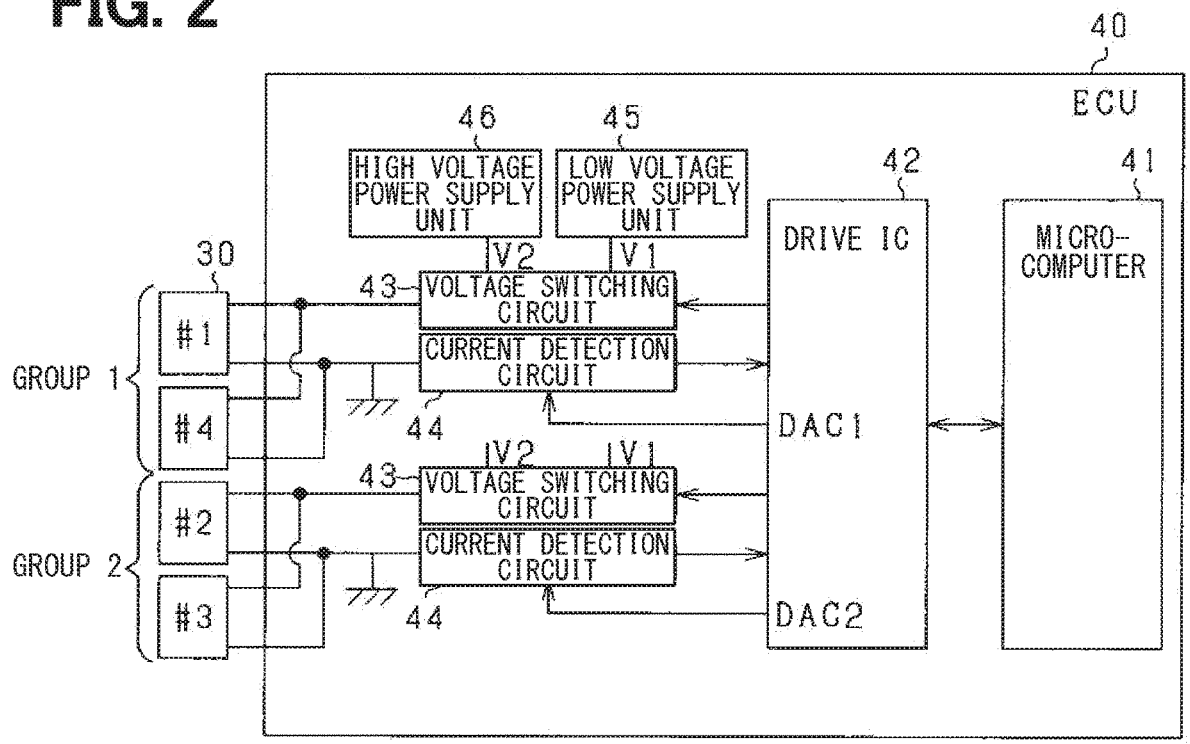
FIG. 2 is a block diagram showing the configuration of an ECU.

As shown in FIG. 2, the ECU 40 has a microcomputer 41 for engine control (microcomputer), a drive IC 42 for injector drive (a drive IC of the fuel injection valve), a voltage switching circuit 43, and a current detection circuit 44. The microcomputer 41 corresponds to the "fuel injection valve control device". The functions of the increase control unit, the hold control unit, and the peak value setting unit are embodied with the microcomputer 41. Further, the fuel injection valve control method including an increase control process and a holding control process is implemented with the microcomputer 41.

The microcomputer 41 computes a required injection amount in correspondence with engine operating status (e.g., the engine speed, engine load, and the like). Further, the microcomputer 41 generates an injection pulse from injection time computed based on the required injection amount, and outputs the injection pulse to the drive IC 42. The drive IC 42 and the voltage switching circuit 43 correspond to the "driving circuit". The drive IC 42 and the voltage switching circuit 43 valve-open drive the fuel injection valve 30 with the injection pulse, to inject fuel for the required injection amount. Further, when the driving current which flows through a coil of the fuel injection valve 30 becomes smaller than an abnormality determination value during driving of the fuel injection valve 30, the microcomputer 41 determines that the fuel injection valve 30 has an abnormality.

The voltage switching circuit 43 is a circuit to switch between a high voltage V1 and the low voltage V2 as a driving voltage applied to the fuel injection valve 30 of each cylinder. More specifically, the voltage switching circuit 43 causes one of a low-voltage power supply unit 45 and a high-voltage power supply unit 46 to supply a driving current to the coil of the fuel injection valve 30 by on/off of an unshown switching device. The low-voltage power supply unit 45 is connected to the above-described battery 48. The low-voltage power supply unit 45 is a low-voltage output circuit to output the low voltage V2 supplied from the battery 48. The high-voltage power supply unit 46 is a high voltage output circuit to output the high voltage V1 (the first voltage, a boosted voltage) of e.g. 60 to 65 V. The high-voltage power supply unit 46 is connected to the battery 48. The high-voltage power supply unit 46 has a boosted circuit to boost the low voltage V2 as a battery voltage.

When the fuel injection valve 30 is valve-open driven with the injection pulse, the high voltage V1 and the low voltage V2 are switched in time series and applied to the fuel injection valve 30. In this case, in an initial stage of valve opening, with the application of the high voltage V1, valve opening response of the fuel injection valve 30 is ensured. Then the application of the high voltage is followed by the application of the low voltage V2, the valve open status of the fuel injection valve 30 is held.

Further, in the present embodiment, the engine 10 is a four-cylinder engine. The fuel injection is implemented by outputting the injection pulse as a fuel injection with the fuel injection valve 30 by cylinder. Note that the combustion order of the #1 to #4 cylinders is #1, #3, #4, and #2 in this order.

In the configuration in FIG. 2, two cylinders in alternate combustion order are set as one group, i.e., drive group 1 and 2. The voltage switching circuit 43 and the current detection circuit 44 are respectively provided by drive group. That is, the voltage switching circuit 43 and the current detection circuit 44 of the drive group 1 perform voltage switching and current detection regarding the fuel injection valve 30 of #1 and #4 cylinders. The voltage switching circuit 43 and the current detection circuit 44 of the drive group 2 perform voltage switching and current detection regarding the fuel injection valve 30 of #2 and #3 cylinders. With this configuration, the respective fuel injection valves 30 are driven in a driving system by drive group.

The current detection circuit 44 detects an energizing current upon valve-open driving of the fuel injection valve 30. The result of detection is successively outputted to the drive IC 42. The current detection circuit 44 may have various configurations. For example, the current detection circuit 44 has a shunt resistor and a comparator. Note that a reference signal corresponding to a reference current is outputted from a DAC port of the drive IC 42 (DAC 1, DAC 2). The comparator of the current detection circuit 44 outputs the result of comparison between the driving current of each fuel injection valve 30 and the reference current.

Figure 3:
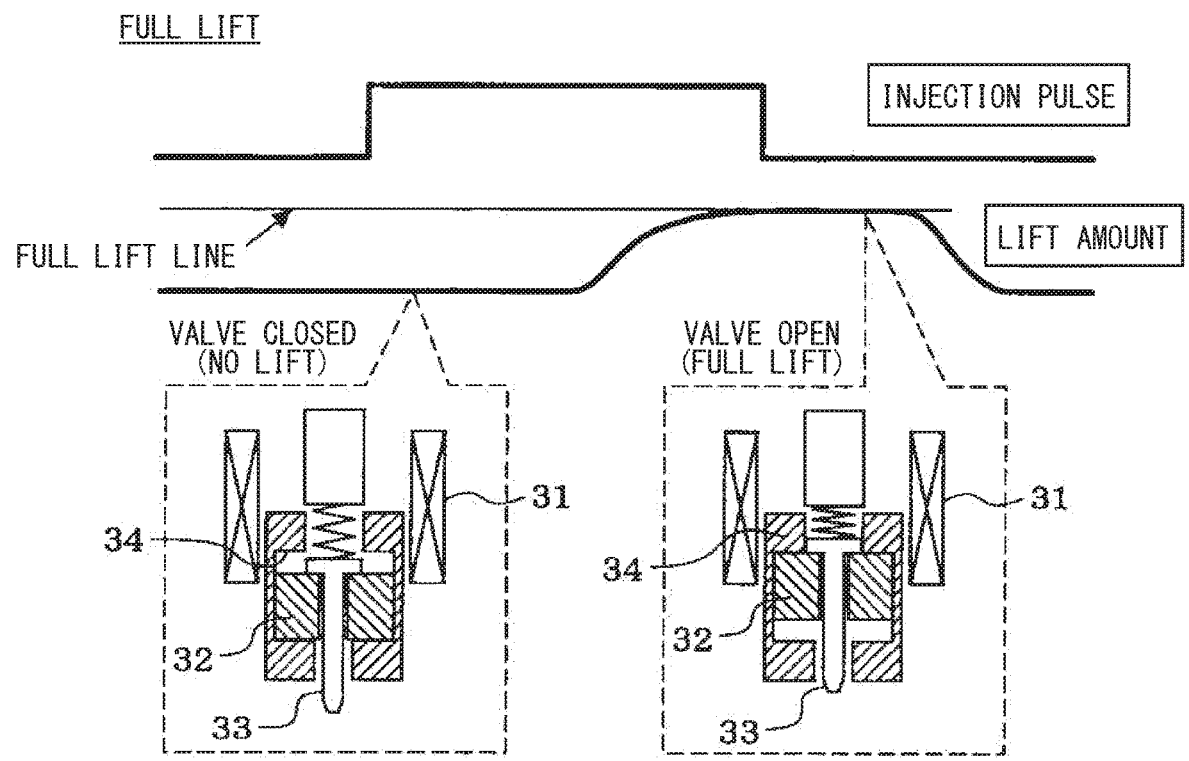
FIG. 3 is a diagram showing the configuration and status of a fuel injection valve.

As shown in FIG. 3, the fuel injection valve 30 includes a coil 31 to cause an electromagnetic force by energization, and a needle 33 (valve body) driven integrally with a plunger 32 (movable core) with the electromagnetic force. That is, the fuel injection valve 30 has the needle 33 to open/close an injection hole (illustration omitted) to inject fuel, and the coil 31 to cause a force in a direction to open the injection hole to act on the needle 33. With movement of the needle 33 to a valve opening position (target position), the fuel injection valve 30 becomes into a valve-open status (a status where the injection hole is open), and fuel injection is performed. When an injection pulse width is comparatively long (when a needle lift mount is a full lift amount), the needle 33 arrives at a full lift position (a position in which the plunger 32 abuts against a stopper 34). When the energization of the coil 31 is stopped in accordance with fall of the injection pulse, with returning of the plunger 32 and the needle 33 to a valve closing position, the fuel injection valve 30 becomes into a valve-closed status, and the fuel injection is stopped.

Note that as the plunger 32 and the needle 33 are separate bodies, the needle 33 and the plunger 32 cause relative displacement in a very short period of a moment of collision of the plunger 32 with the stopper 34 upon valve opening, and a moment of collision of the needle 33 with a valve seat upon valve closing. This configuration enables to suppress bounding of the plunger 32 with respect to the stopper 34 upon valve opening and bounding of the needle 33 with respect to the valve seat upon valve closing. Note that the fuel injection valve 30 is not limited to the configuration where the plunger 32 and the needle 33 are separate bodies, but may have a configuration where these elements are integrated.

When an excessive driving current flows with the high voltage V1 upon start of driving of the fuel injection valve 30, the operation of the needle 33 until the needle 33 is held at the target position becomes unstable, or operation noise of the fuel injection valve 30 becomes large.

Figure 4:
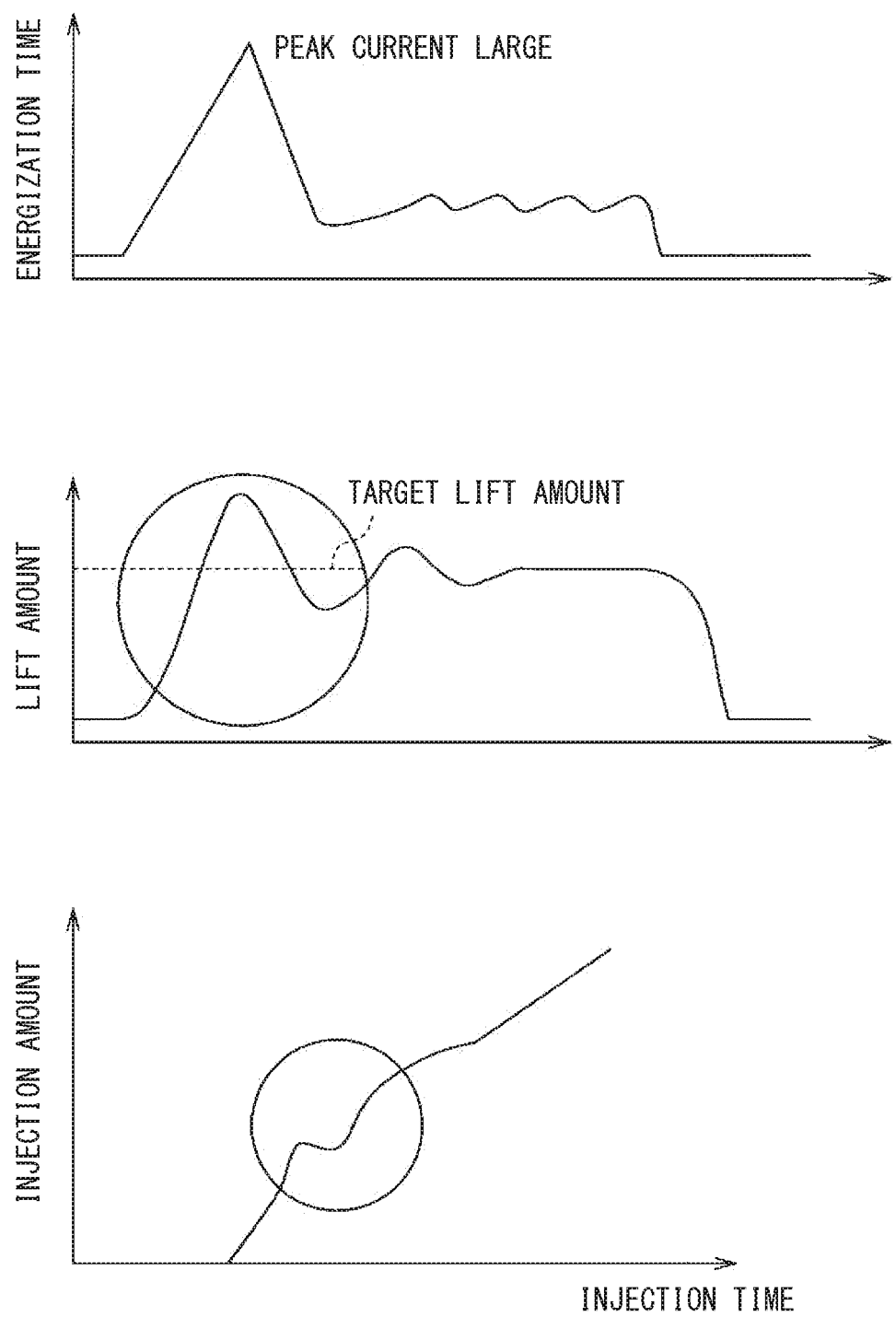
FIG. 4 is a time chart showing an injection mode when a peak current is large.

FIG. 4 is a time chart showing an injection mode when a peak current (the peak value of the driving current) is large. As shown in the figure, the lift amount of the needle 33 overshoots a target lift amount around the peak current, subsequently undershoots the target lift amount, and is converged to the target lift amount. Accordingly, in the graph of the fuel injection amount with the fuel injection valve 30, an "S" curve (a large step) occurs in the middle.

Figure 5:
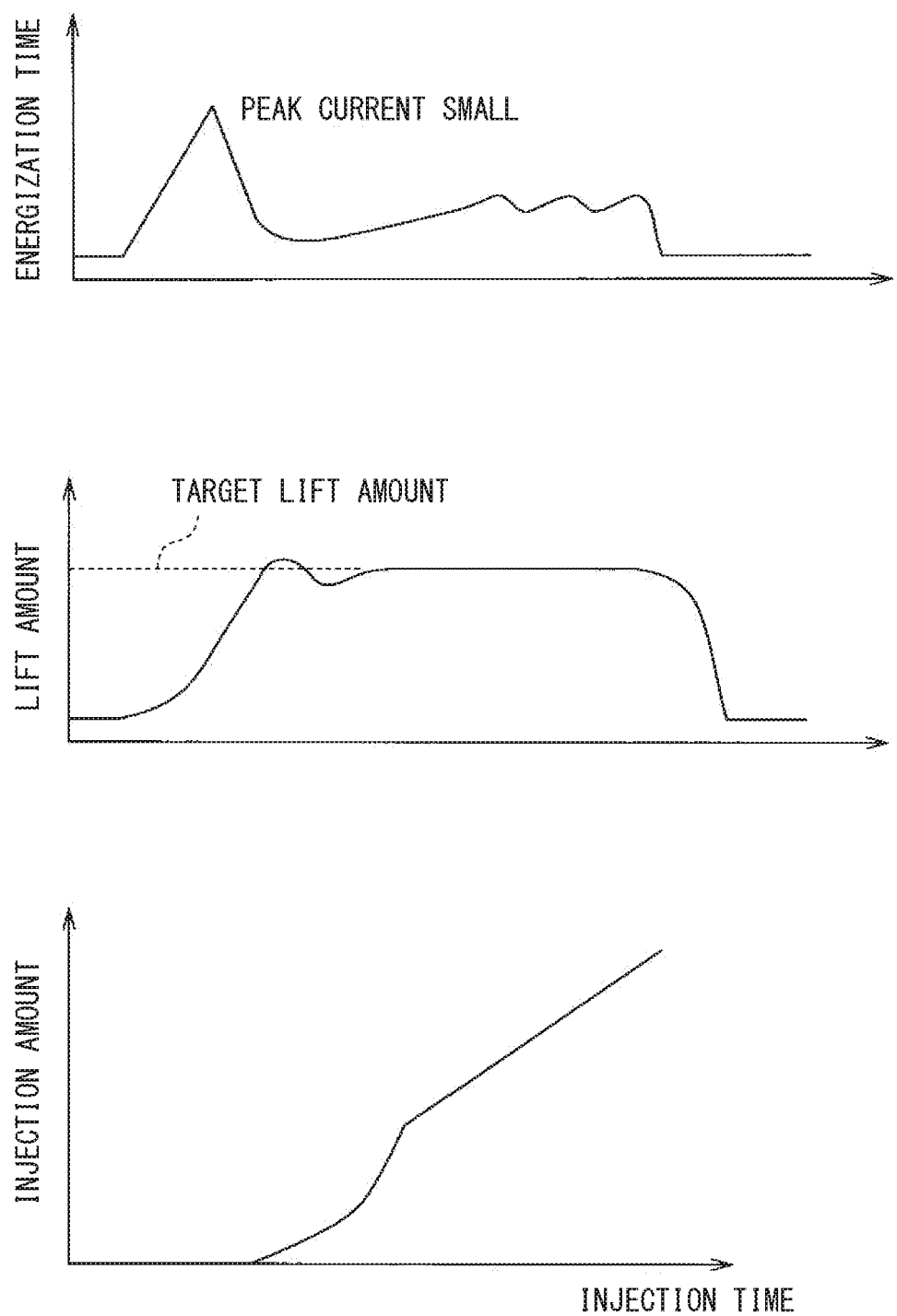
FIG. 5 is a time chart showing an injection mode when the peak current is small.

FIG. 5 is a time chart showing an injection mode when the peak current is small. Note that in FIG. 4 and FIG. 5, the fuel pressure is the same. As shown in FIG. 5, the lift amount of the needle 33 slightly overshoots the target lift amount around the peak current subsequently slightly undershoots the target lift amount, and is converged to the target lift amount. Accordingly, in the graph of the fuel injection amount with the fuel injection valve 30, a large step does not occur in the middle.

Accordingly, it is assumable that the driving current applied upon valve opening operation of the fuel injection valve 30 is a minimum current. In the present embodiment, the microcomputer 41 (the peak value setting unit) sets a target peak value of the driving current based on fuel pressure. More specifically, the higher the fuel pressure is, the larger value the microcomputer 41 sets as the target peak value. Accordingly, this configuration enables to set a target peak value appropriate to the fuel pressure, and this configuration enables to restrict the peak current from becoming excessively large.

In FIG. 3, with movement of the needle 33 in the direction to open the injection hole, a counter electromotive force occurs in the coil 31, and the force to move the needle 33 in the direction to open the injection hole is weakened. In detail, with the movement of the plunger 32 in the direction of the stopper 34, a counter electromotive force occurs in the coil 31, to reduce the driving current flowing through the coil 3. Accordingly, when the force to move the needle 33 in the direction to open the injection hole is small, e.g., when the peak current is small, upon switching of the voltage applied to the fuel injection valve 30 from the high voltage V1 to the low voltage V2, the needle 33 moves to close the injection hole in some cases.

Figure 6:
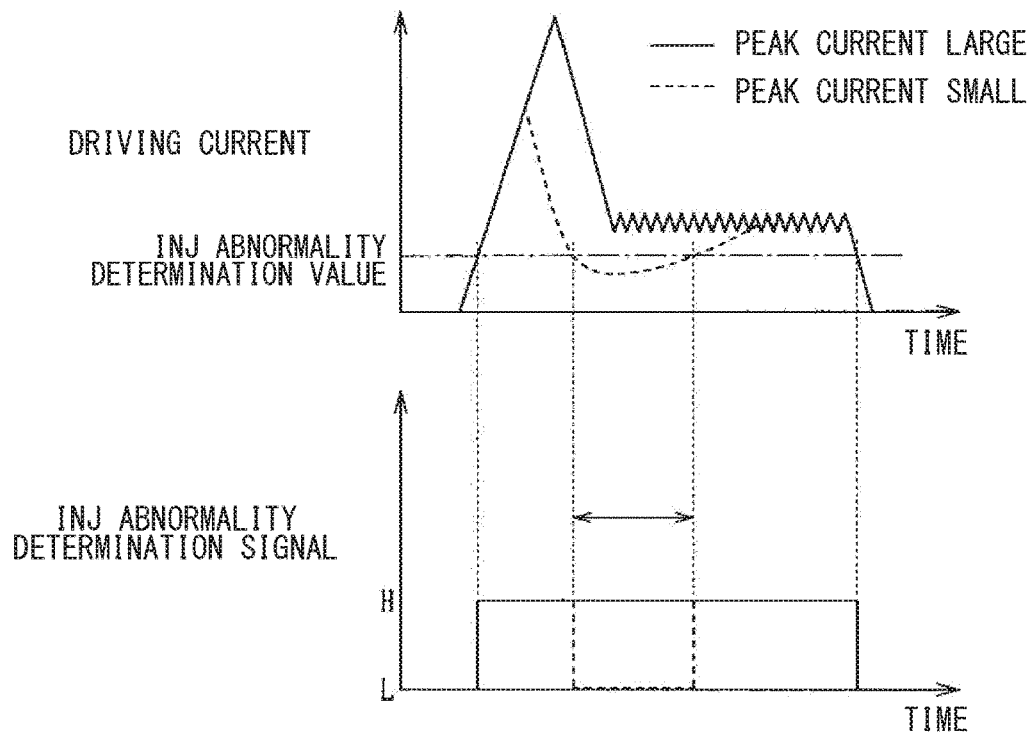
FIG. 6 is a time chart showing a driving current and an abnormality determination signal when the peak current is large and when the peak current is small.

FIG. 6 is a time chart showing the driving current and an abnormality determination signal when the peak current is large and when the peak current is small. In the abnormality determination signal, H indicates normality, and L indicates abnormality. As shown with a broken line in the figure, when the peak current is small and when the driving current becomes smaller than the abnormality determination value during driving of the fuel injection valve 30, the microcomputer 41 determines that the fuel injection valve 30 has an abnormality, and switches the abnormality determination signal to L. Accordingly, the microcomputer 41 erroneously determines that the fuel injection valve 30 has an abnormality although the fuel injection valve 30 does not have an abnormality.

Figure 7:
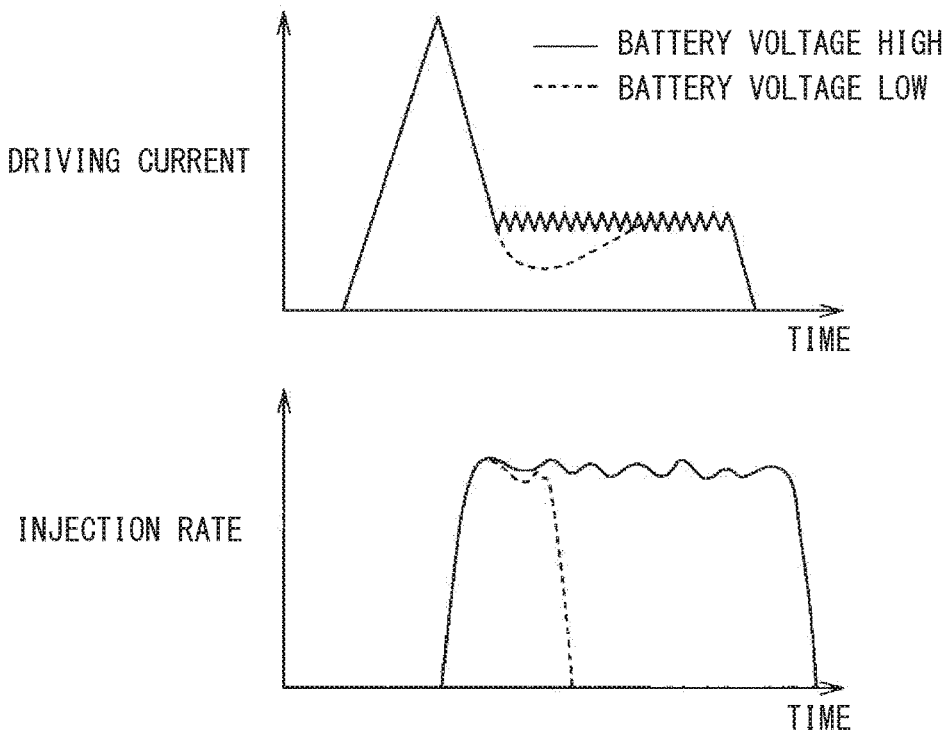
FIG. 7 is a time chart showing the driving current and an injection rate when a battery voltage is high and when the battery voltage is low.

FIG. 7 is a time chart showing the driving current and an injection rate when the battery voltage is high and when the battery voltage is low. As shown with a broken line in the figure, when the battery voltage is low and when the driving current flowing through the coil 31 becomes small, the force to move the needle 33 in the direction to open the injection hole is weakened. Accordingly, needle 33 cannot be held at the target position, and the needle 33 moves toward the injection hole to close the injection hole in some cases. In such case, the injection rate cannot be held at a target injection rate, and the injection rate falls to 0.

Figure 8:
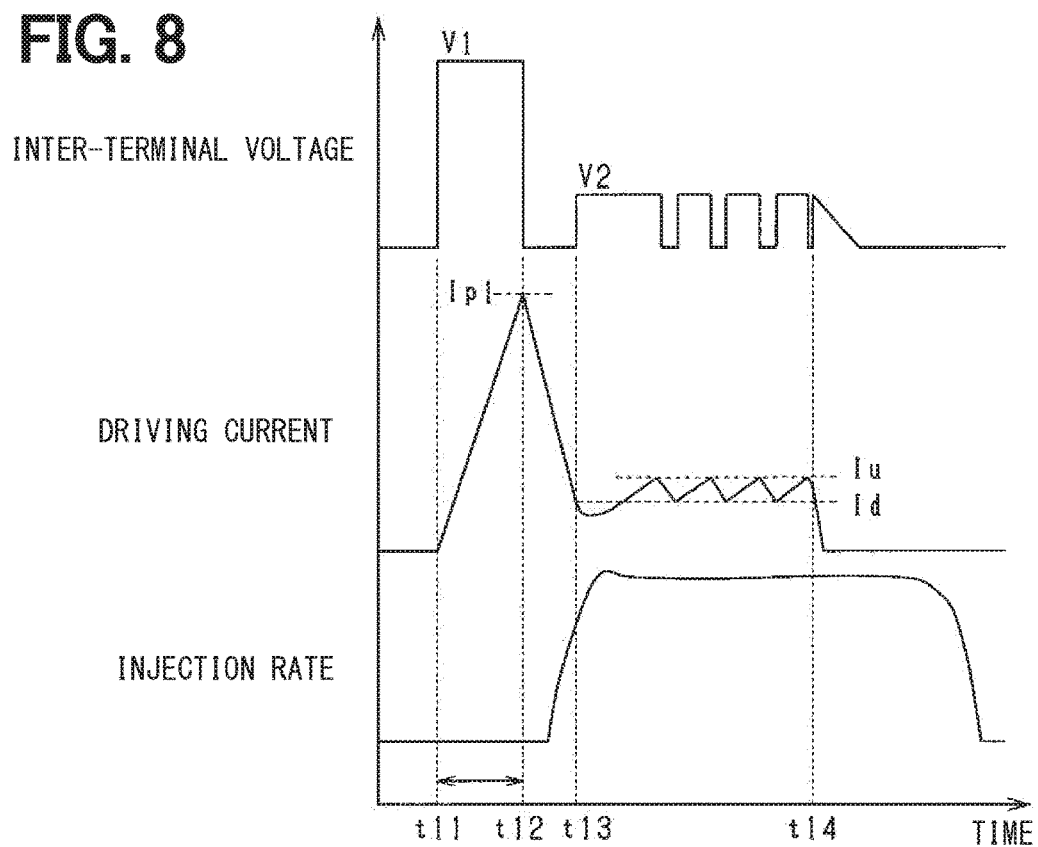
FIG. 8 is a time chart showing an inter-terminal voltage, the driving current, and the injection rate when the peak current is large.

FIG. 8 is a time chart showing an inter-terminal voltage, the driving current, and the injection rate when the peak current is large. The inter-terminal voltage is an inter-terminal voltage of the coil 31 of the fuel injection valve 30, i.e., the voltage applied to the coil 31.

At time t11, the application voltage to the coil 31 is switched to the high voltage V1. With this configuration, during a boosted period of time t11 to t12, the driving current increases sharply. Thereafter, at time t12, when the driving current reaches a previously-determined target peak value Ip1 (peak value), the application of the high voltage V1 is stopped. At this time, lifting of the needle 33 is started at the timing of arrival of the driving current at the target peak value Ip1 or immediately before the arrival. Fuel injection is started in accordance with the lifting. The determination as to whether or not the driving current has reached the target peak value Ip1 is performed based on a detected current detected with the current detection circuit 44. That is, in the boosted period (t11 to t12), the drive IC 42 determines whether or not the detected current has exceeded the target peak value Ip1. When detected current>Ip1 holds, the switching of the application voltage (stoppage of application of the high voltage V1) is performed with the voltage switching circuit 43.

At and after time t12, the driving current falls in accordance with the stoppage of application of the high voltage V1. The low voltage V2 is intermittently applied to the fuel injection valve 30 based on the previously-determined target current and the detected current detected with the current detection circuit 44. In FIG. 8, an upper limit value Iu and a lower limit value Id of the target current to hold the valve-open status are determined. The low voltage V2 is applied such that the driving current varies between the upper limit value Iu and the lower limit value Id. Note that the width from the lower limit value Id to the upper limit value Iu corresponds to the predetermined variation range. In detail, when the detected current reaches the lower limit value Id, the voltage application is turned on, and when the detected current reaches the upper limit value Iu, the voltage application is turned off. At time t13, the detected current first reaches the lower limit value Id and the voltage application is turned on. At this time, the driving current becomes smaller than the lower limit value Id with the counter electromotive force occurred in the coil 31. However, as the target peak value Ip1 is large and the force to move the needle 33 in the valve opening direction is large, the needle 33 is held at the target position.

Thereafter, at time t14, when the injection pulse is turned off, the voltage application to the coil 31 is stopped, and the driving current becomes 0. Thereafter, in accordance with the stoppage of the energization to the coil 31, the lifting of the needle 33 is terminated, and in accordance with the termination of the lifting, the fuel injection rate falls to 0.

Figure 9:
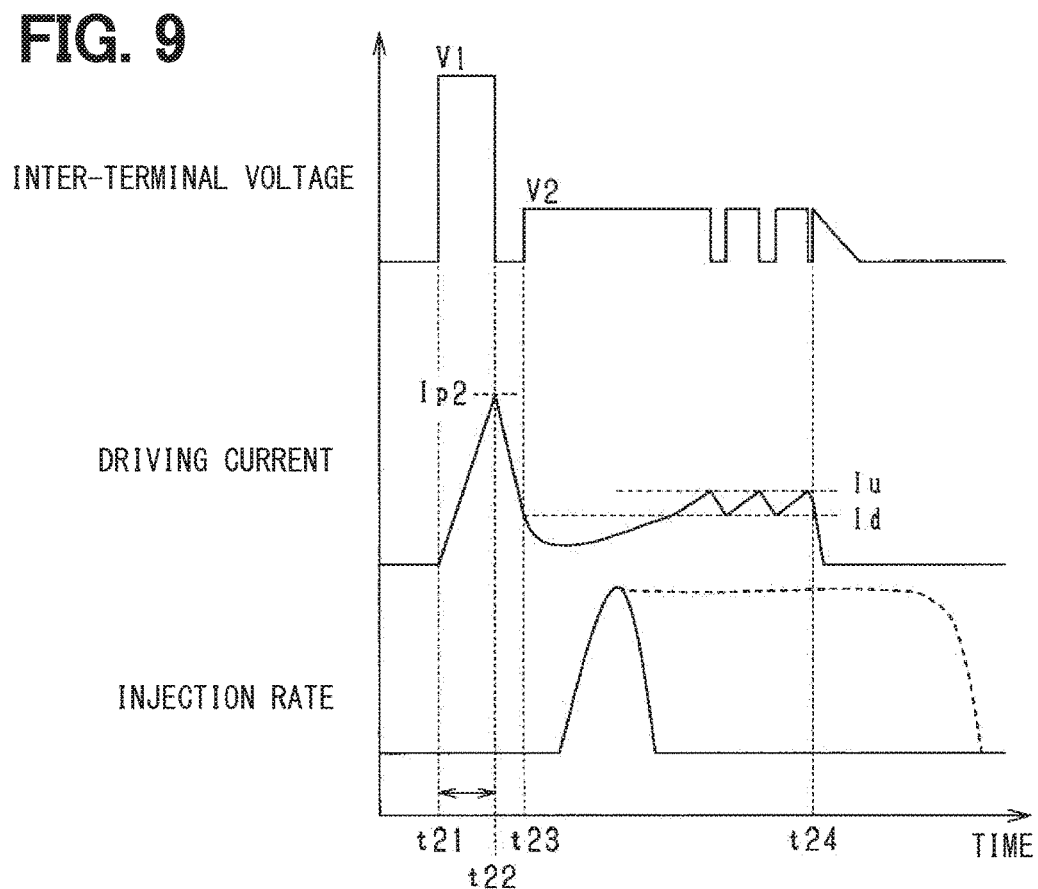
FIG. 9 is a time chart showing the inter-terminal voltage, the driving current, and the injection rate when the peak current is small.

FIG. 9 is a time chart showing the inter-terminal voltage, the driving current, and the injection rate when the peak current is small.

At time t21, the application voltage to the coil 31 is switched to the high voltage V1. Thereafter, at time t22, when the driving current reaches the previously-determined target peak value Ip2 (peak value), the application of the high voltage V1 is stopped (Ip1>Ip2). During the boosted period (t21 to t22), the drive IC 42 determines whether or not the detected current has exceeded the target peak value Ip2. When the detected current>Ip2 holds, the switching of the application voltage (stoppage of application of the high voltage V1) is performed with the voltage switching circuit 43.

At and after time t22, the low voltage V2 is intermittently applied to the fuel injection valve 30 based on the previously-determined target current and the detected current detected with the current detection circuit 44. As in the case of FIG. 8, the low voltage V2 is applied such that the driving current varies between the upper limit value Iu and the lower limit value Id. At this time, at time t23, the detected current first reaches the lower limit value Id, and the voltage application is turned on. The driving current becomes smaller than the lower limit value Id with the counter electromotive force occurred in the coil 31. When the peak current is small, the period where the counter electromotive force occurs in the coil 31 is long in comparison with the case where the peak current is large. Accordingly, the amount of decrease in the driving current from the lower limit value Id becomes large. Further, as the target peak value Ip2 is small and the force to move the needle 33 in the valve opening direction is small, the needle 33 is not held at the target position but moves toward the injection hole.

Accordingly, at time t24, the lifting of the needle 33 is terminated before the injection pulse is turned off, and the fuel injection rate falls to 0 before time t24 in some cases. Note that the graph of broken line indicates the injection rate when the needle 33 is held at the target position. Further, when the driving current becomes smaller than the abnormality determination value during the driving of the fuel injection valve 30, the microcomputer 41 determines that the fuel injection valve 30 has an abnormality, and switches the abnormality determination signal to L.

Figure 10:
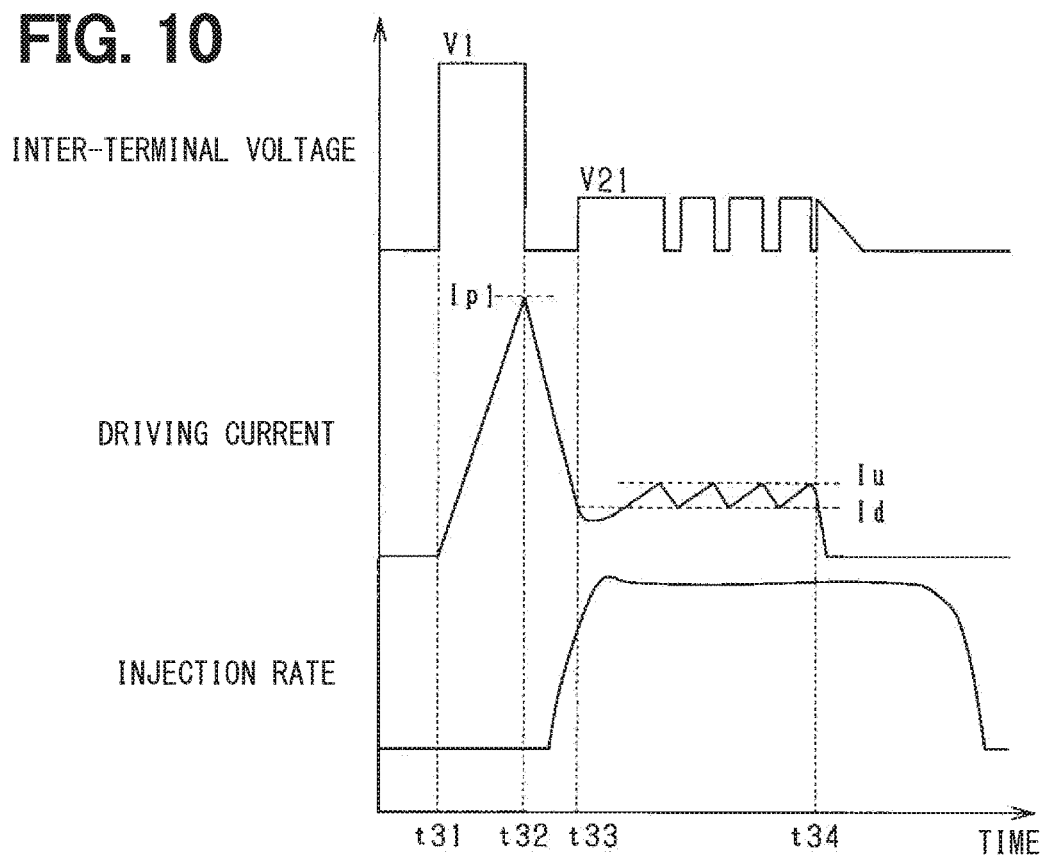
FIG. 10 is a time chart showing the inter-terminal voltage, the driving current, and the injection rate when the battery voltage is high.

FIG. 10 is a time chart showing the inter-terminal voltage, the driving current, and the injection rate when the battery voltage is high.

At time t31, the application voltage to the coil 31 is switched to the high voltage V1. Thereafter, at time t32, when the driving current reaches the previously-determined target peak value Ip1 (peak value), the application of the high voltage v1 is stopped.

At and after time t32, the low voltage V21 is intermittently applied to the fuel injection valve 30 based on the previously-determined target current and the detected current detected with the current detection circuit 44. The low voltage V21 is applied such that the driving current varies between the upper limit value Iu and the lower limit value Id. At this time, at time t33, the detected current first reaches the lower limit value Id and the voltage application is turned on. The driving current becomes smaller than the lower limit value Id with the counter electromotive force occurred in the coil 31. However, as the low voltage V21 that is a battery voltage is high, the driving current increases comparatively quickly to the upper limit value Iu. Further, as the target peak value Ip1 is large and the force to move the needle 33 in the valve opening direction is large, the needle 33 is held at the target position.

Thereafter, at time t34, when the injection pulse is turned off, the voltage application to the coil 31 is stopped, and the driving current becomes 0. Thereafter, the lifting of the needle 33 is terminated in accordance with the stoppage of energization to the coil 31, and in accordance with the stoppage of energization, the fuel injection rate falls to 0.

Figure 11:
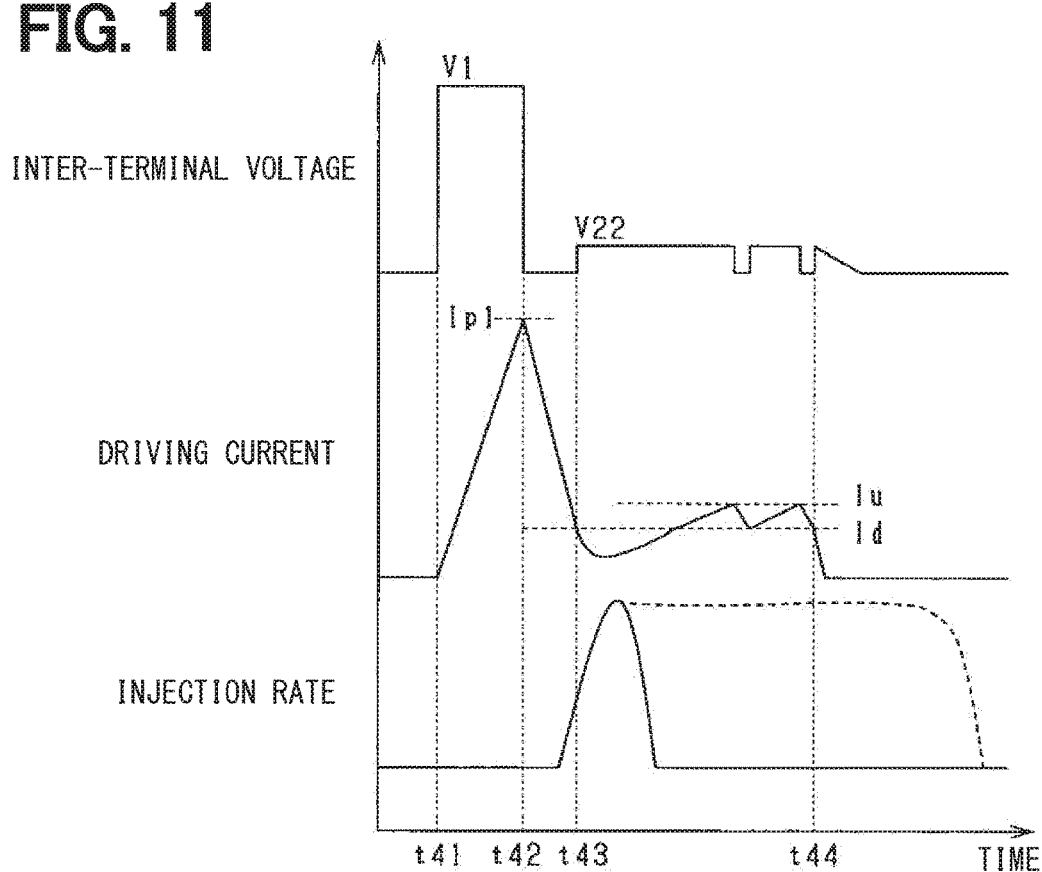
FIG. 11 is a time chart showing the inter-terminal voltage, the driving current, and the injection rate when the battery voltage is low.

FIG. 11 is a time chart showing the inter-terminal voltage, the driving current, and the injection rate when the battery voltage is low.

At time t41, the application voltage to the coil 31 is switched to the high voltage V1. Thereafter, at time t42, when the driving current reaches the previously-determined target peak value Ip1 (peak value), the application of the high voltage V1 is stopped.

At and after time t42, the low voltage V2 is intermittently applied to the fuel injection valve 30 based on the previously-determined target current and the detected current detected with the current detection circuit 44. The low voltage V22 is applied such that the driving current varies between the upper limit value Iu and the lower limit value Id. At this time, at t43, the detected current first reaches the lower limit value Id, the voltage application is turned on. The driving current becomes smaller than the lower limit value Id with the counter electromotive force occurred in the coil 31. As the low voltage V22 that is a battery voltage is low, the speed of increase in the driving current is low, and the amount of decrease in the driving current from the lower limit value Id becomes large. Accordingly, even when the target peak value Ip1 is large, the needle 33 is not held at the target position, but moves toward the injection hole.

Accordingly, at time t44, the lifting of the needle 33 is terminated before the injection pulse is turned off, and the fuel injection rate falls to 0 before time t44 in some cases. Note that the graph of the broken line shows the injection rate when the needle 33 is held at the target position. Further, when the driving current becomes smaller than the abnormality determination value during the driving of the fuel injection valve 30, the microcomputer 41 determines that the fuel injection valve 30 has an abnormality, and switches the abnormality determination signal to L.

Figure 12:
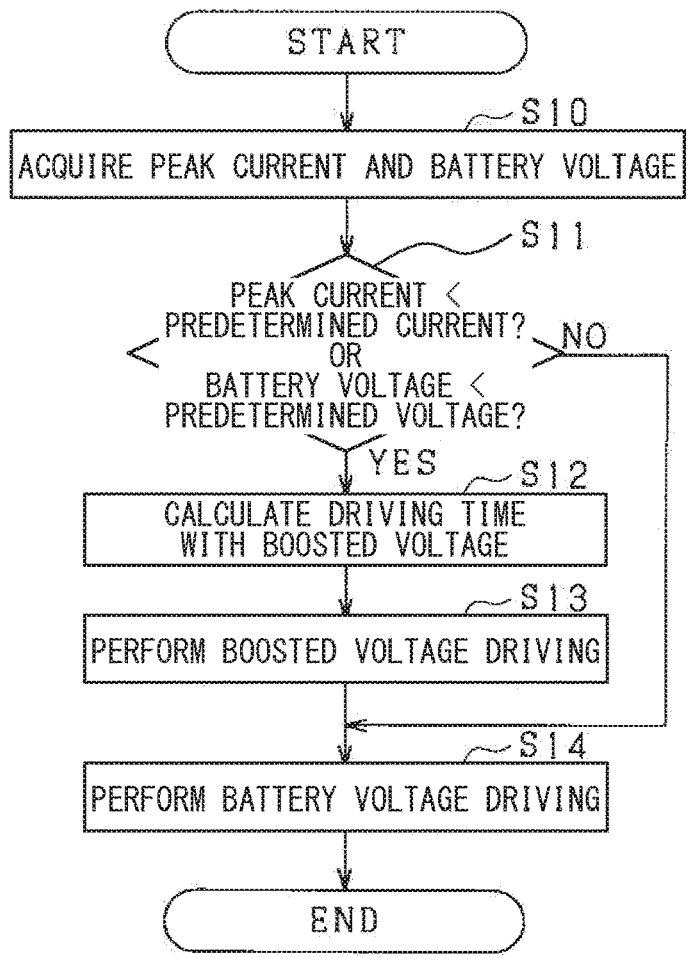
FIG. 12 is a flowchart showing a control procedure of the fuel injection valve according to a first embodiment.

FIG. 12 is a flowchart showing a control procedure of the fuel injection valve according to the present embodiment. The series of processing is performed with the microcomputer 41 upon fuel injection with the fuel injection valve 30 of each cylinder.

First, in the boosted period where the high voltage V1 is applied to the coil 31, the peak current Ip of the driving current and the battery voltage Vb are acquired (S10). In detail, the high voltage V1 is applied with the drive IC 42 and the voltage switching circuit 43 to the coil 31, the peak value (peak current Ip) of the driving current is acquired based on the detected current detected with the current detection circuit 44, and the battery voltage Vb is acquired based on the detected voltage detected with the voltage sensor 49. Note that when the driving current reaches the target peak value Ip1 (Ip2) set based on the fuel pressure, the application of the high voltage V1 is stopped.

Next, it is determined whether the peak current Ip is smaller than a predetermined current Ipr, or the battery voltage Vb is lower than a predetermined voltage Vbr (S11). The predetermined current Ipr is set to a peak current corresponding to the fuel pressure in low-load operation of the engine 10. As the peak current Ip, the target peak value Ip1 (Ip2) may be used, or the peak value of the driving current detected with the current detection circuit 44 may be used. The predetermined voltage Vbr is set to a supply voltage of the battery 48, e.g., 8 V, when the charging capacity of battery 48 has decreased to a predetermined capacity.

Figure 13:
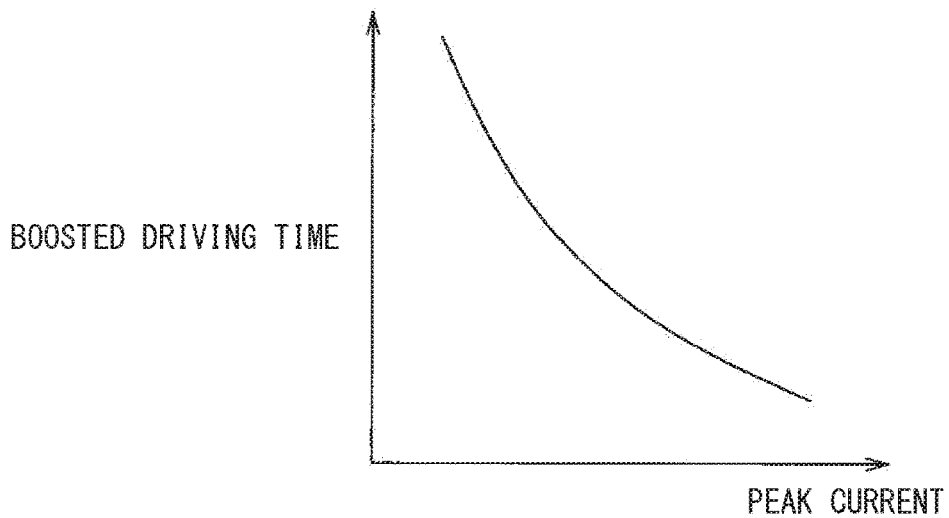
FIG. 13 is a graph showing the relationship between the peak current and boosted driving time.
Figure 14:
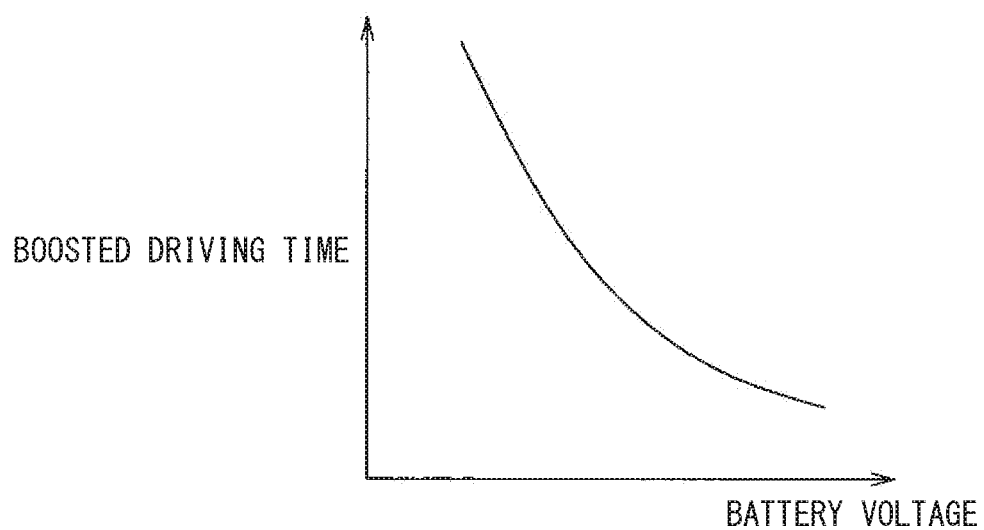
FIG. 14 is a graph showing the relationship between the battery voltage and the boosted driving time.
Figure 15:
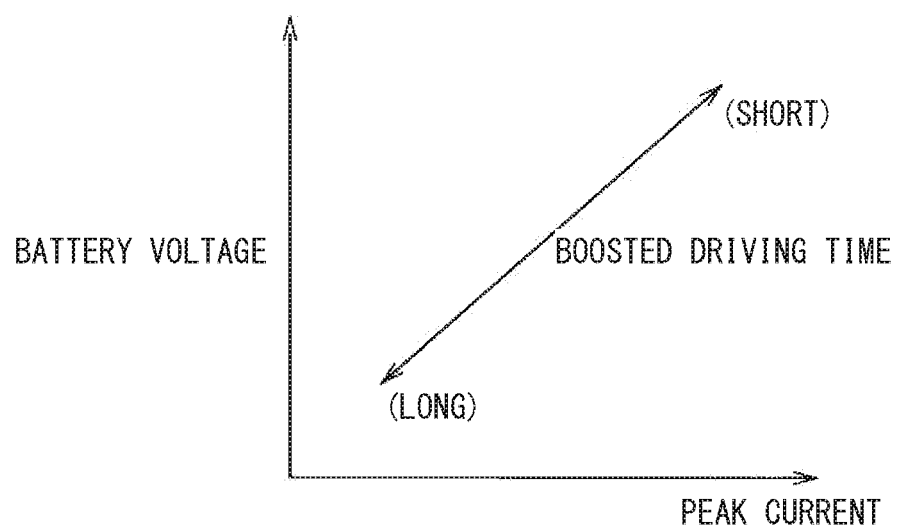
FIG. 15 is a map showing the relationship among the peak current, the battery voltage, and the boosted driving time.

In the determination at S11, when it is determined that the peak current Ip is smaller than the predetermined current Ipr or the battery voltage Vb is lower than the predetermined voltage Vbr (S11: YES), driving time upon driving of the fuel injection valve 30 with the boosted voltage (high voltage V1) is computed (S12). In detail, as shown in FIG. 13, the smaller the peak current Ip is, the longer period is set as the driving time with the boosted voltage. Note that as shown in FIG. 14, a configuration may be employable such that the lower the battery voltage Vb is, the longer period is set as the driving time at the boosted voltage. Further, as shown in FIG. 15, a configuration may be employable such that the smaller the peak current Ip is, the longer period is set as the driving time with the boosted voltage, and the lower the battery voltage Vb is, the longer period is set as the driving time with the boosted voltage.

That is, by setting the driving time with the boosted voltage in this manner, the driving with the boosted voltage is performed at S13 such that when the driving current is increased to the target peak value Ip1 (Ip2), the application of the high voltage V1 is stopped and subsequently the driving current becomes larger than a minimum current Imn set to be smaller than the above-described lower limit value Id. The minimum current Imn is set to the above-described abnormality determination value of the fuel injection valve 30. Further, by setting the driving time with the boosted voltage as described above, when the driving current is increased to the target peak value Ip1 (Ip2), the application of the high voltage V1 is stopped, subsequently, after the start of the driving with the boosted voltage at S13, the driving with the boosted voltage is performed (continued) until occurrence of the counter electromotive force ceases in the coil 31.

Next, the driving with the boosted voltage is performed for the set driving time (S13). In detail, the high voltage V1 is applied based on the detected current detected with the current detection circuit 44 such that the driving current varies between the above-described upper limit value Iu and the lower limit value Id.

Next, the driving with the battery voltage Vb is performed until the injection pulse is turned off (S14). In detail, the low voltage V2 is applied based on the detected current detected with the current detection circuit 44 such that the driving current varies between the upper limit value Iu and the lower limit value Id. That is, the driving with the boosted voltage is continued until occurrence of the counter electromotive force ceases in the coil 31. Then, when occurrence of the counter electromotive force ceases in the coil 31, the driving with the battery voltage Vb is performed. Thereafter, the series of processing is terminated (END).

Further, when negative determination is made in the determination at S11, i.e., when it is determined that the peak current Ip is not smaller than the predetermined current Ipr, and it is determined that the battery voltage Vb is not smaller than the predetermined voltage Vbr (S11: NO), the processing at S14 is performed. That is, the driving with the battery voltage Vb is performed, without performing the driving with the boosted voltage, until the injection pulse is turned off.

Note that the processing at S10 corresponds to the processing as the increase control unit. The processing at S11 to S14 corresponds to the processing as the hold control unit. In short, in the processing at S11 to S14, when the driving current is increased to the target peak value Ip1 (Ip2), the application of the high voltage V1 is stopped, subsequently, a first holding control to apply the low voltage V2 to the coil 31 based on the peak current Ip or the battery voltage Vb to hold the driving current at the target current, and a second holding control to apply the high voltage V1 to the coil 31 to hold the driving current at the target current, are switched and performed.

Figure 16:
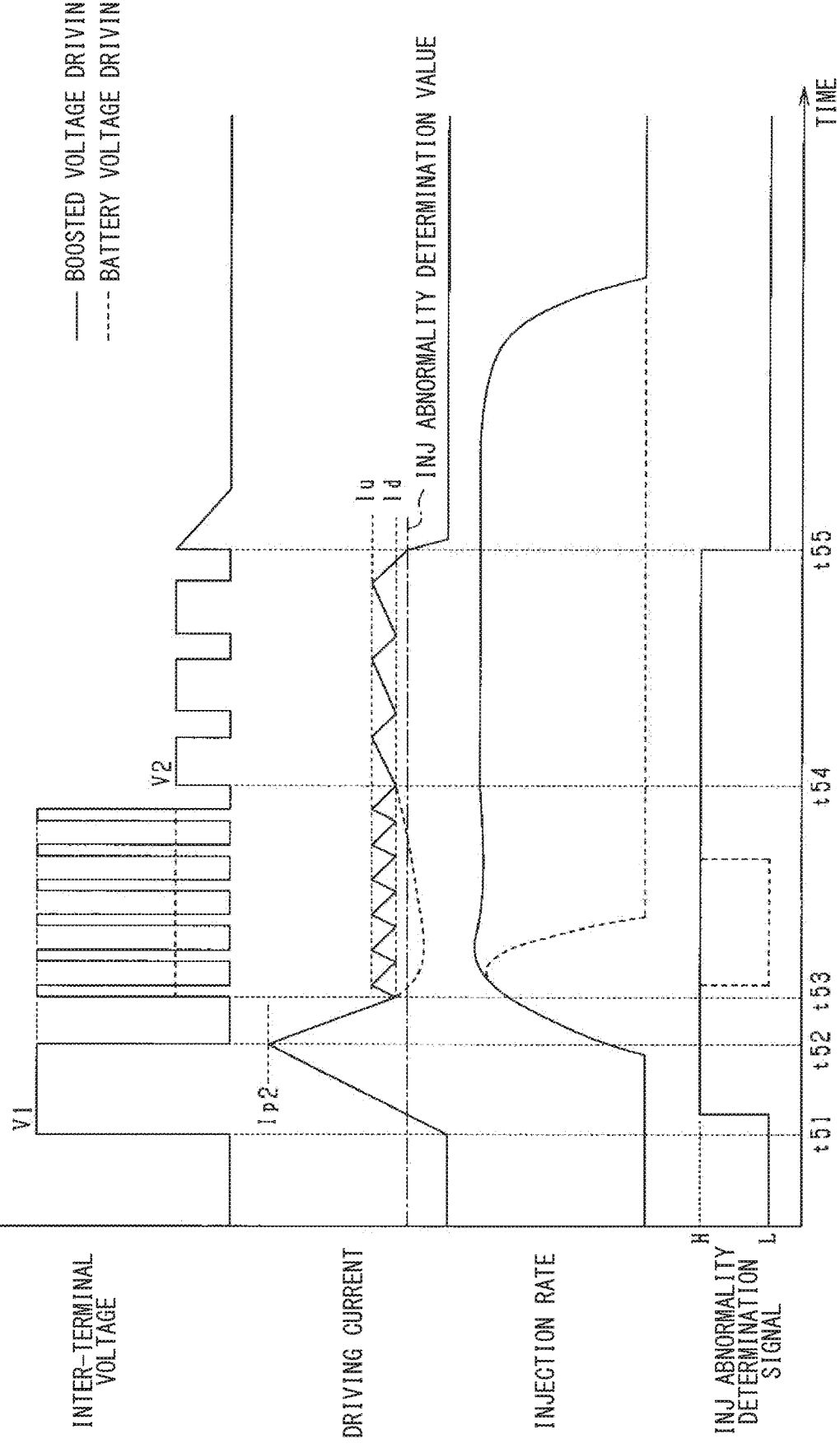
FIG. 16 is a time chart showing a mode of control of the fuel injection valve according to the first embodiment.

FIG. 16 is a time chart showing a mode of control of the fuel injection valve according to the present embodiment. Note that in the figure, the target peak value Ip2 is smaller than the predetermined current Ipr.

At time t51, the application voltage to the coil 31 is switched to the high voltage V1. Thereafter, at step t52, when the driving current reaches the target peak value Ip2 set based on the fuel pressure, the application of the high voltage V1 is stopped.

Note that as the target peak value Ip2 is smaller than the predetermined current Ipr, at and after time t52, the high voltage V1 is applied such that the driving current varies between the upper limit value Iu and the lower limit value Id. At this time, at time t53, the detected current first reaches the lower limit value Id and the voltage application is turned on. As indicated with a solid line, the driving current quickly rises with the high voltage V1.

Note that at and after time t52, when the low voltage V2 is applied such that the driving current varies between the upper limit value Iu and the lower limit value Id, the driving current becomes smaller than the abnormality determination value with the counter electromotive force occurred in the coil 31, as indicated with a broken line. Accordingly, the abnormality determination signal changes from H to L. Further, the needle 33 is not held at the target position but moves toward the injection hole. Thereafter, the lifting of the needle 33 is terminated, and the fuel injection rate falls to 0.

On the contrary, when the driving is performed with the high voltage V1 from time t53, the driving current varies between the upper limit value Iu and the lower limit value Id. Further, the driving current is held at a value larger than the abnormality determination value. Accordingly, the abnormality determination signal is held at H.

At and after time t54, the low voltage V2 is applied such that the driving current varies between the upper limit value Iu and the lower limit value Id. With this configuration, the driving current varies between the upper limit value Iu and the lower limit value Id.

Thereafter, at time t55, when the injection pulse is turned off, the voltage application to the coil 31 is stopped, and the driving current becomes 0. Thereafter, in accordance with the stoppage of energization to the coil 31, the lifting of the needle 33 is terminated, and in accordance with the termination of the lifting, the fuel injection rate falls to 0.

Note that in the figure, the target peak value Ip2 is smaller than the predetermined current Ipr. When the battery voltage Vb (low voltage V2) is lower than the predetermined voltage Vbr, a mode similar to that shown in FIG. 1 is acquired.

The present embodiment as described in detail above has the following advantages.

When the force to move the needle 33 in the direction to open the injection hole is weak, the microcomputer 41 switches to and performs the second holding control. The second holding control is to apply the high voltage V1 (boosted voltage) with the drive IC 42 and the voltage switching circuit 43 to the coil 31, to hold the driving current at the target current. Accordingly, this configuration enables to restrict the driving current from becoming smaller than the target current, thus this configuration enables to restrict the needle 33 from moving toward the injection hole relative to the target position.

During the boosted period, when the force to move the needle 33 in the direction to open the injection hole is not small, the microcomputer 41 switches to and performs the first holding control. The first holding control is to apply the low voltage V2 (battery voltage Vb) lower than the high voltage V1 with the drive IC 42 and the voltage switching circuit 43 to the coil 31, to hold the driving current at the target current. Accordingly, this configuration enables to restrict the driving current from becoming larger than the target current, thus this configuration enables to suppress power consumption with the coil 31.

When the driving current is increased to the target peak value Ip1 (Ip2), the microcomputer 41 stops the application of the high voltage V1 with the drive IC 42 and the voltage switching circuit 43, subsequently switches between the first holding control and the second holding control and performs one of the first holding control and the second holding control which is switched based on the target peak value Ip1 (Ip2) or the low voltage V2, such that the driving current becomes larger than the minimum current Imn (abnormality determination value) set to be smaller than the target current. Accordingly, even when the target peak value Ip1 (Ip2) of the driving current is small, this configuration enables to avoid a situation where the driving current becomes smaller than the minimum current Imn set to be smaller than the target current. Accordingly, upon holding of the needle 33 at the target position, this configuration enables to restrict abnormality determination in the abnormality determination of the fuel injection valve 30.

When the driving current is increased to the target peak value Ip1 (Ip2), the microcomputer 41 stops the application of the high voltage V1 with the drive IC 42 and the voltage switching circuit 43. Then, when the target peak value Ip1 (Ip2) is smaller than the predetermined current Ipr, the microcomputer 41 switches to and performs the second holding control. Accordingly, this configuration enables to restrict the driving current from becoming smaller than the target current, thus this configuration enables to restrict the needle 33 from moving toward the injection hole relative to the target position.

The low voltage V2 is the battery voltage Vb supplied from the battery 48. When the driving current is increased to the target peak value Ip1 (Ip2), the microcomputer 41 stops the application of the high voltage V1 with the drive IC 42 and the voltage switching circuit 43. Then when the low voltage V2 is lower than the predetermined voltage Vbr, the microcomputer 41 switches to and performs the second holding control. Accordingly, when the low voltage V2 supplied from the battery 48 becomes lower than the predetermined voltage Vbr, this configuration enables to switch to and perform the second holding control, and this configuration enables to restrict the driving current from becoming smaller than the target current.

When the driving current is increased to the target peak value p1 (Ip2), the microcomputer 41 stops the application of the high voltage V1 with the drive IC 42 and the voltage switching circuit 43, and starts the second holding control based on the target peak value Ip1 (Ip2) or the low voltage V2. The microcomputer 41 continues the second holding control until occurrence of the counter electromotive force ceases in the coil 31. When occurrence of the counter electromotive force ceases in the coil 31, the microcomputer 41 switches to and performs the first holding control. Accordingly, during a period where the counter electromotive force occurs in the coil 31, it is possible, with the second holding control, to restrict the needle 33 from moving toward the injection hole relative to the target position. Then, when occurrence of the counter electromotive force ceases in the coil 31, this configuration enables to suppress power consumption with the coil 31 by switching to the first holding control.

Note that as described above, when the target peak value Ip1 (Ip2) of the driving current is set based on the fuel pressure and when the peak current Ip of the driving current is small, the force to move the needle 33 in the direction to open the injection hole becomes small. Accordingly, in some cases, upon switching of the voltage applied to the coil 31 to the low voltage V2 lower than the high voltage V1, the needle 33 moves to close the injection hole.

Accordingly, a configuration may be employable such that when the driving current is increased to the target peak value Ip1 (Ip2), the microcomputer 41 (hold control unit) stops the application of the high voltage V1 with the drive IC 42 and the voltage switching circuit 43, subsequently, when the fuel pressure is lower than predetermined pressure, switches to and performs the second holding control. The predetermined pressure is set to e.g. the fuel pressure upon low-load operation of the engine 10. According to this configuration, when the fuel pressure is lower than the predetermined pressure, i.e., when the target peak value Ip1 (Ip2) is smaller than the predetermined current, this configuration enables to switch to and performs the second holding control, and this configuration enables to restrict the driving current from becoming smaller than the target current.

Second Embodiment

Hereinbelow, a second embodiment will be described mainly about differences from the first embodiment. In the present embodiment, when the driving current is increased to the target peak value Ip1 (Ip2), the condition for execution of the driving with the high voltage V1 is changed. Note that elements the same as those in the first embodiment will have the same reference numerals and explanations of the elements will be omitted.

Figure 17:
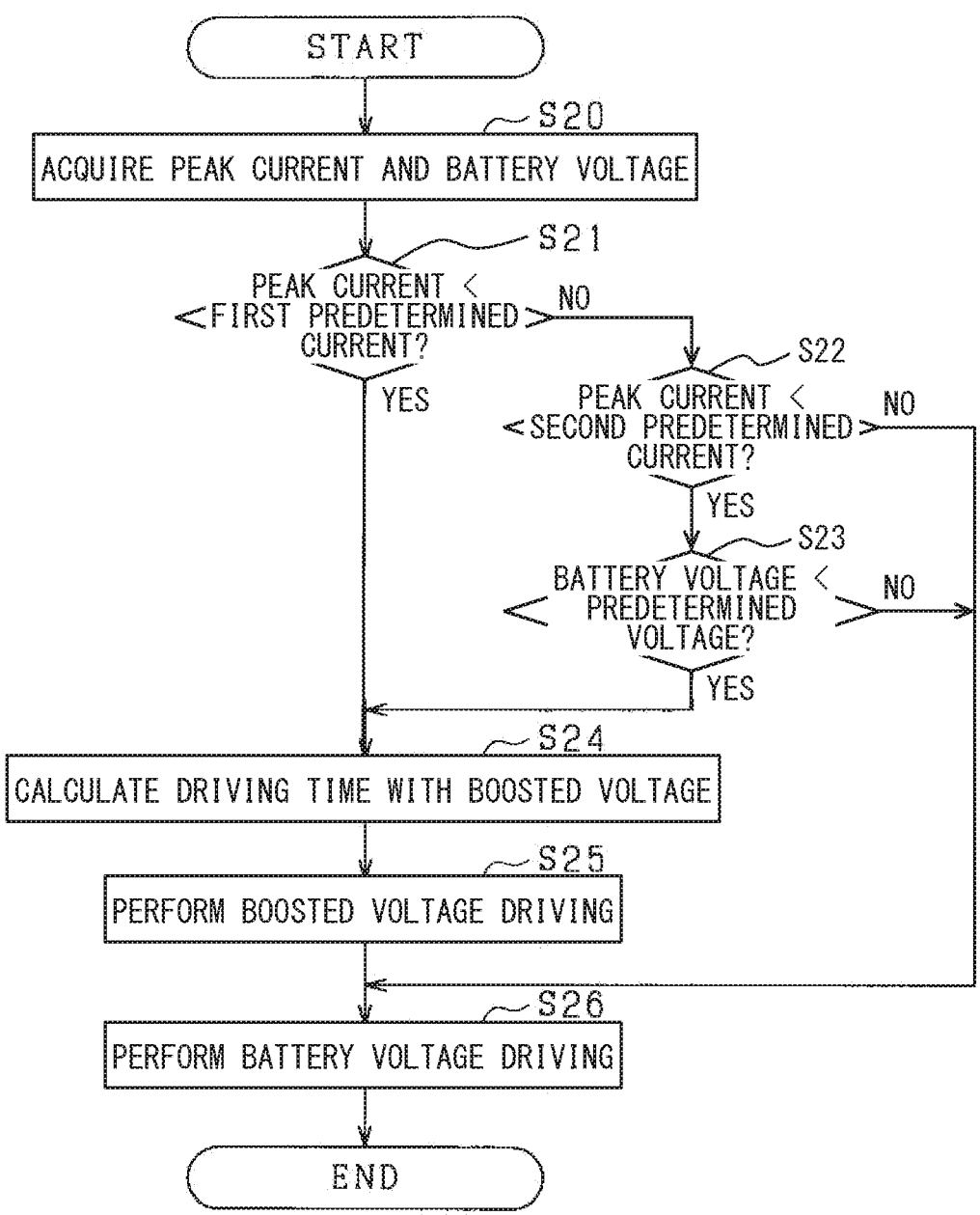
FIG. 17 is a flowchart showing the control procedure of the fuel injection valve according to a second embodiment.

FIG. 17 is a flowchart showing the control procedure of the fuel injection valve according to the present embodiment. The series of processing is performed with the microcomputer 41 upon fuel injection with the fuel injection valve 30 of each cylinder.

The processing at S20 is the same as the processing at S10 in FIG. 12.

At S21, it is determined whether or not the peak current Ip is smaller than a first predetermined current Ipr1. As in the case of the above-described predetermined current Ipr, the first predetermined current Ipr1 is set to the peak current corresponding to the fuel pressure upon low-load operation of the engine 10. In the determination, when it is determined that the peak current Ip is not smaller than the first predetermined current Ipr1 (S21: NO), it is determined whether or not the peak current Ip is smaller than a second predetermined current Ipr2 (S22). The second predetermined current Ipr2 is set to the peak current corresponding to the fuel pressure upon high-load operation of the engine 10.

In the determination at S22, when it is determined that the peak current Ip is smaller than the second predetermined current Ipr2 (S22: YES), it is determined whether or not the battery voltage Vb is lower than the predetermined voltage Vbr (S23). The predetermined voltage Vbr is set to the supply voltage of the battery 48 e.g., 10 V, when the charging capacity of the battery 48 has decreased to a predetermined capacity. In the determination, when it is determined that the battery voltage Vb is lower than the predetermined voltage Vbr (S23: YES), the driving time upon driving of the fuel injection valve 30 at the boosted voltage (high voltage V1) is computed (S24). The processing at S24 is the same as the processing at S12 in FIG. 12. Further, in the determination at S21, when it is determined that the peak current Ip is smaller than the first predetermined current Ipr1 (S21: YES), the processing at S24 is performed.

Next, the driving with the boosted voltage is performed for the set driving time (S25). The processing at S25 is the same as the processing at S13 in FIG. 12.

Next, the driving with the battery voltage Vb is performed until the injection pulse is turned off (S26). The processing at S26 is the same as the processing at S14 in FIG. 12. Thereafter, the series of processing is terminated (END).

On the other hand, in the determination at S22, when it is determined that the peak current Ip is not smaller than the second predetermined current Ip2 (S22: NO), and in the determination at S23, when it is determined that the battery voltage Vb is not lower than the predetermined voltage Vbr (S23: NO), the processing at S26 is performed.

Note that the processing at S20 corresponds to the processing as the increase control unit. The processing at S21 to S26 corresponds to the processing as the hold control unit. In short, in the processing at S21 to S26, when the driving current is increased to the target peak value Ip1 (Ip2), the application of the high voltage V1 is stopped, subsequently the first holding control to apply the low voltage V2 to the coil 31 based on the peak current Ip and the battery voltage Vb, to hold the driving current at the target current, and the second holding control to apply the high voltage V1 to the coil 31 to hold the driving current at the target current, are switched and performed.

The present embodiment has the following advantages. Only the advantages different from the advantages in the first embodiment will be described here.

When the microcomputer 41 stops the application of the high voltage V1 (boosted voltage), and when the peak current Ip is smaller than the first predetermined current Ipr1, the microcomputer 41 switches to and performs the second holding control. Accordingly, even when the peak current Ip of the driving current is smaller than the first predetermined current Ipr1, this configuration enables to restrict the driving current from becoming smaller than the target current, thus this configuration enables to restrict the needle 33 from moving toward the injection hole relative to the target position.

When the peak current Ip is larger than the first predetermined current Ipr1, smaller than the second predetermined current Ipr2 larger than the first predetermined current Ipr1, and when the low voltage V2 (battery voltage) is lower than the predetermined voltage Vbr, the microcomputer 41 switches to and performs the second holding control. Accordingly, even when the peak current Ip of the driving current is not larger than the second predetermined current Ipr2 and when the low voltage V2 is lower than the predetermined voltage Vbr, this configuration enables to restrict the driving current from becoming smaller than the target current.

Third Embodiment

Hereinbelow, a third embodiment will be described mainly about differences from the first embodiment. In the present embodiment, the driving current is increased to the target peak value Ip1 (Ip2), subsequently the variation range of the driving current upon execution of the driving with the high voltage V1 is optimized. Note that elements the same as those in the first embodiment will have the same reference numerals and explanations of the elements will be omitted.

In the second holding control, as the high voltage V1 is applied to the coil 31 to hold the driving current at the target current, the variation range of the driving current often increases. When the variation range of the driving current increases, the operation of the needle 33 becomes unstable, thus the fuel injection amount (injection rate) often varies.

Figure 18:
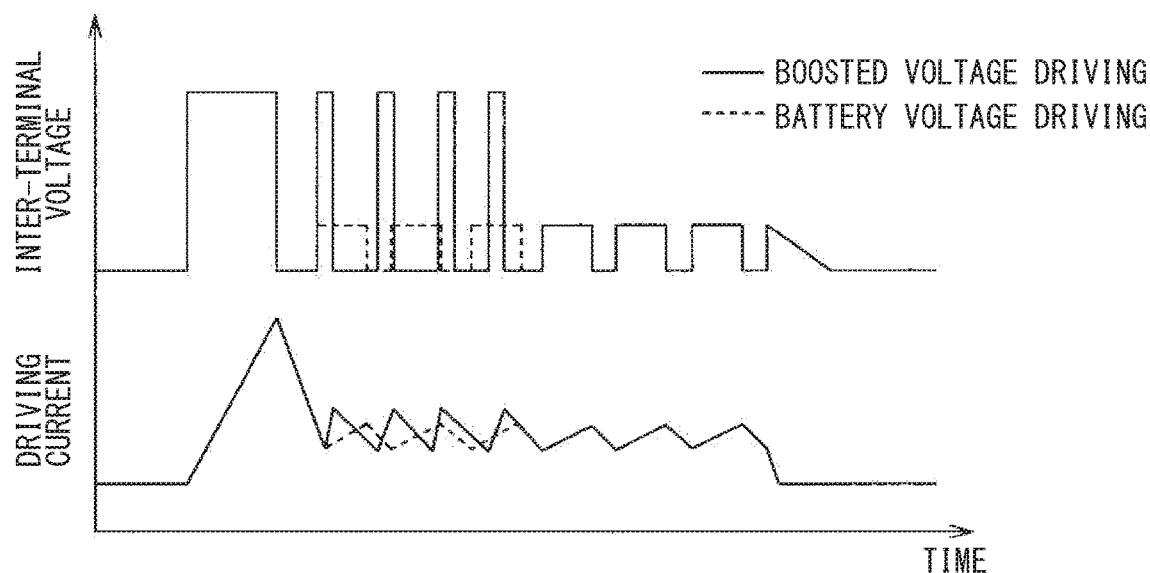
FIG. 18 is a time chart showing the inter-terminal voltage and the driving current in boosted voltage driving and battery voltage driving.

FIG. 18 is a time chart showing the inter-terminal voltage and the driving current in the boosted voltage driving and the battery voltage driving. As described above, the microcomputer 41 stops the application of the high voltage V1 (boosted voltage) subsequently switches between the first holding control and the second holding control and performs one of the first holding control and the second holding control which is switched. In this case, as the inter-terminal voltage applied to the coil 31 mutually differs, the increase rate of the driving current mutually differs.

Figure 19:
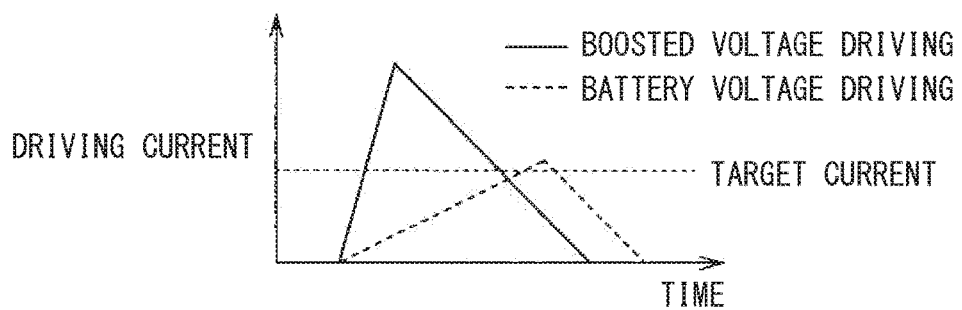
FIG. 19 is a time chart showing an enlarged part of the driving current.

FIG. 19 is a time chart showing an enlarged part of the driving current in FIG. 18. As shown in the figure, even though the voltage application is turned off when the detected current detected with the current detection circuit 44 reaches the target current, the overshoot amount of the driving current in the boosted voltage driving is larger than the overshoot amount of the driving current in the battery voltage driving.

Figure 20:
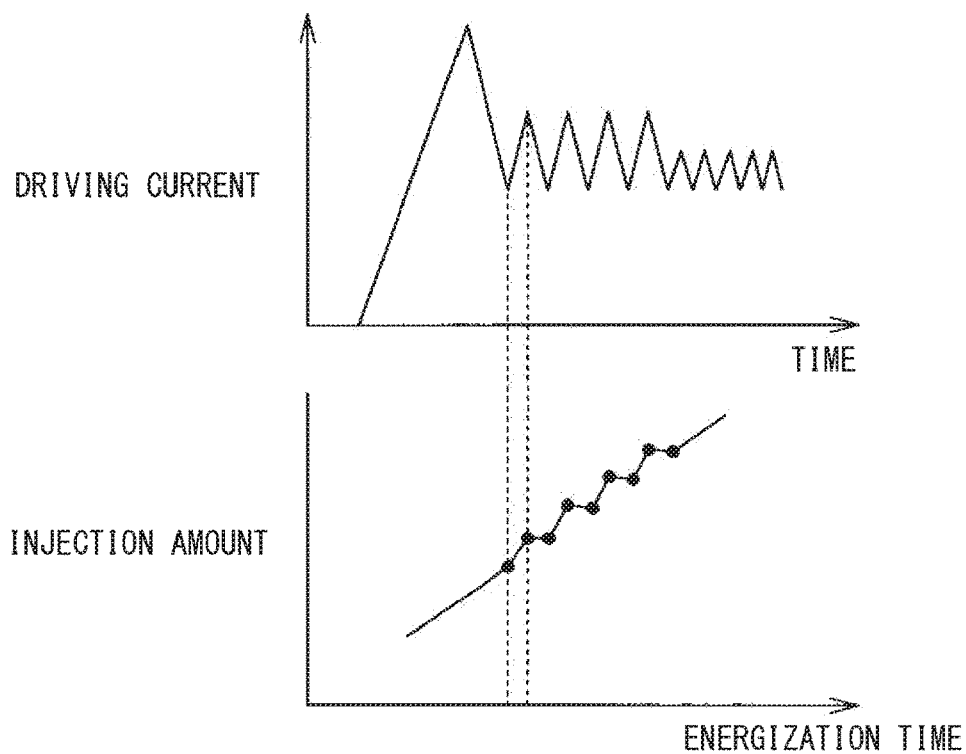
FIG. 20 is a time chart showing a fuel injection amount when a variation range of the driving current is large.

FIG. 20 is a time chart showing a fuel injection amount when the variation range of the driving current is large. As shown in the figure, the injection amount does not increase at a constant speed with respect to time of energization to the fuel injection valve 30, and the variation of the increase rate of the injection amount (injection rate) becomes large.

Figure 21:
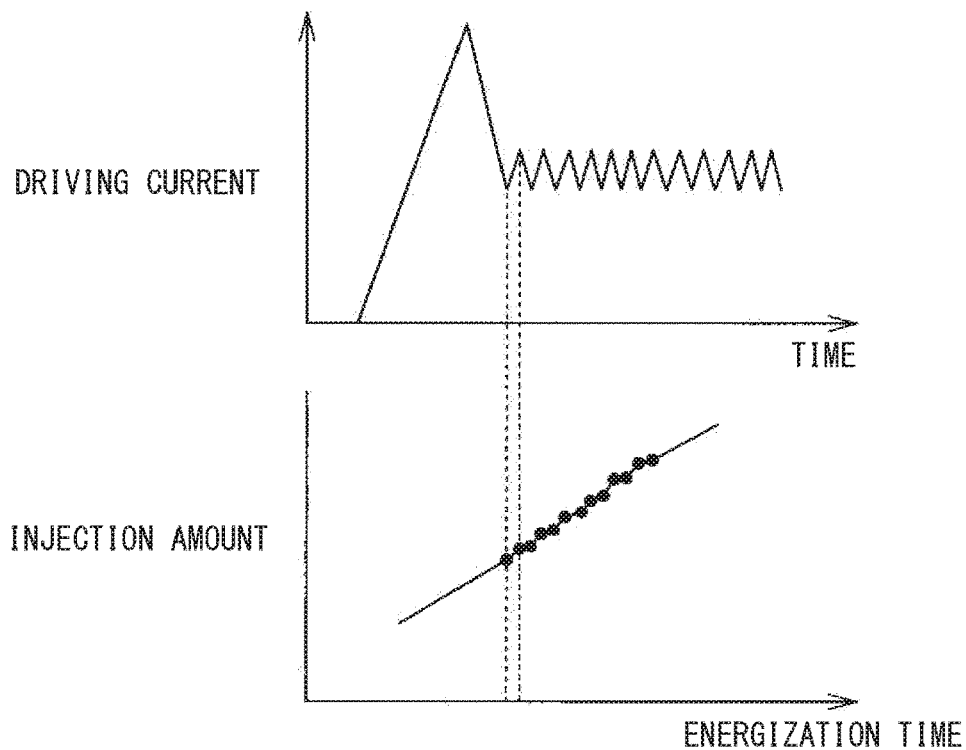
FIG. 21 is a time chart showing the fuel injection amount when the variation range of the driving current is small.

FIG. 21 is a time chart showing the fuel injection amount when the variation range of the driving current is small. As shown in the figure, the injection amount increases at an approximately constant speed with respect to the time of energization to the fuel injection valve 30, and the variation of the increase rate of the injection amount (injection rate) becomes small.

Figure 22:
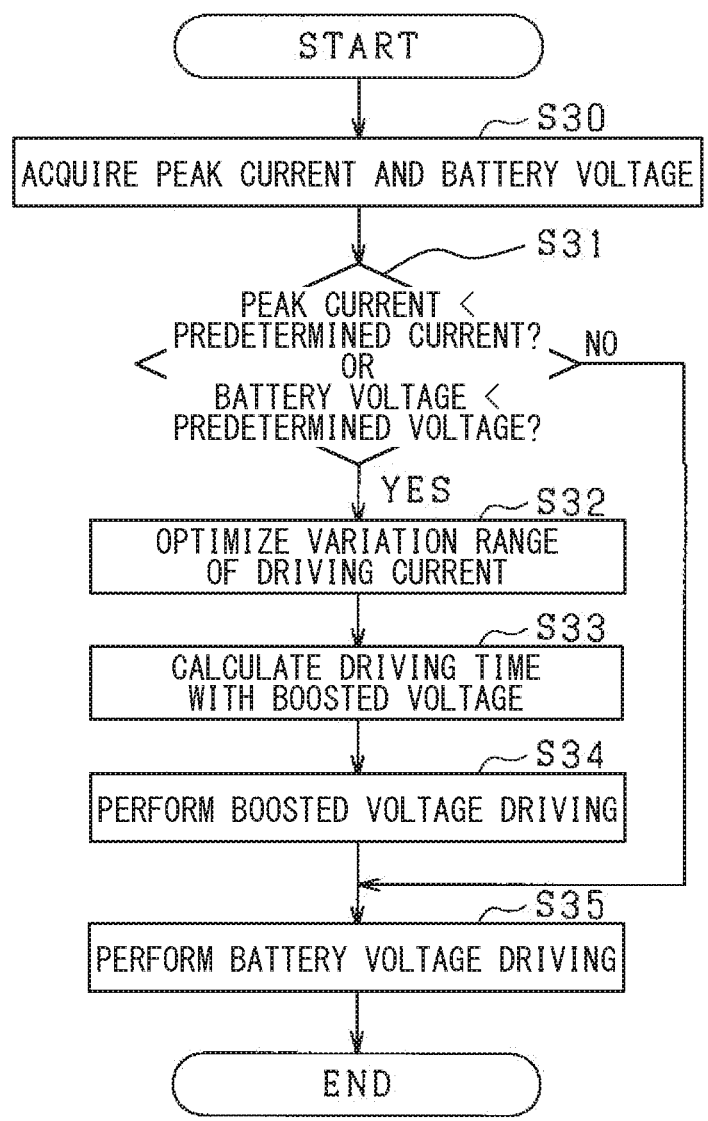
FIG. 22 is a flowchart showing the control procedure of the fuel injection valve according to a third embodiment.

FIG. 22 is a flowchart showing the control procedure of the fuel injection valve according to the present embodiment. The series of processing is performed with the microcomputer 41 upon fuel injection with the fuel injection valve 30 of each cylinder.

The processing at S30 and S31 is the same as the processing at S10 and S11 in FIG. 12.

At S32, the variation range of the driving current upon driving of the fuel injection valve 30 with the boosted voltage (high voltage V1) is optimized. For example, as in the case of the driving with the low voltage V2 (battery voltage Vb), the variation range of the driving current is set such that the driving current varies between the upper limit value Iu and the lower limit value Id.

The processing at S33 is the same as the processing at S12 in FIG. 12.

At S34, the driving with the boosted voltage is performed for the set driving time such that the variation range of the driving current becomes the set variation range. In detail, the on time and the off time of the boosted voltage are controlled in anticipation of the overshoot amount of the driving current upon turning off of the application of the boosted voltage. Note that a configuration may be employable such that apparent upper limit value Iu and apparent lower limit value Id of the target current of the driving current are set such that the variation range of the driving current becomes the set variation range, and when the detected current reaches the lower limit value Id, the voltage application is turned on, and when the detected current reaches the upper limit value Iu, the voltage application is turned off.

The processing at S35 is the same as the processing at S14 in FIG. 12.

Note that the processing at S30 corresponds to the processing as the increase control unit. The processing at S31 to S35 corresponds to the processing as the hold control unit.

According to the present embodiment, this configuration enables to make the variation range of the driving current in the second holding control equal to the variation range of the driving current in the first holding control, and this configuration enables to restrict the operation of the needle 33 from becoming unstable. Note that the variation range of the driving current upon driving of the fuel injection valve 30 with the boosted voltage may be set to be larger than the variation range of the driving current upon driving of the fuel injection valve 30 with the battery voltage Vb.

Note that the above-described respective embodiments may be changed and performed as follows. The elements the same as those in the first embodiment will have the same reference numerals and explanations of the elements will be omitted.

Figure 23:
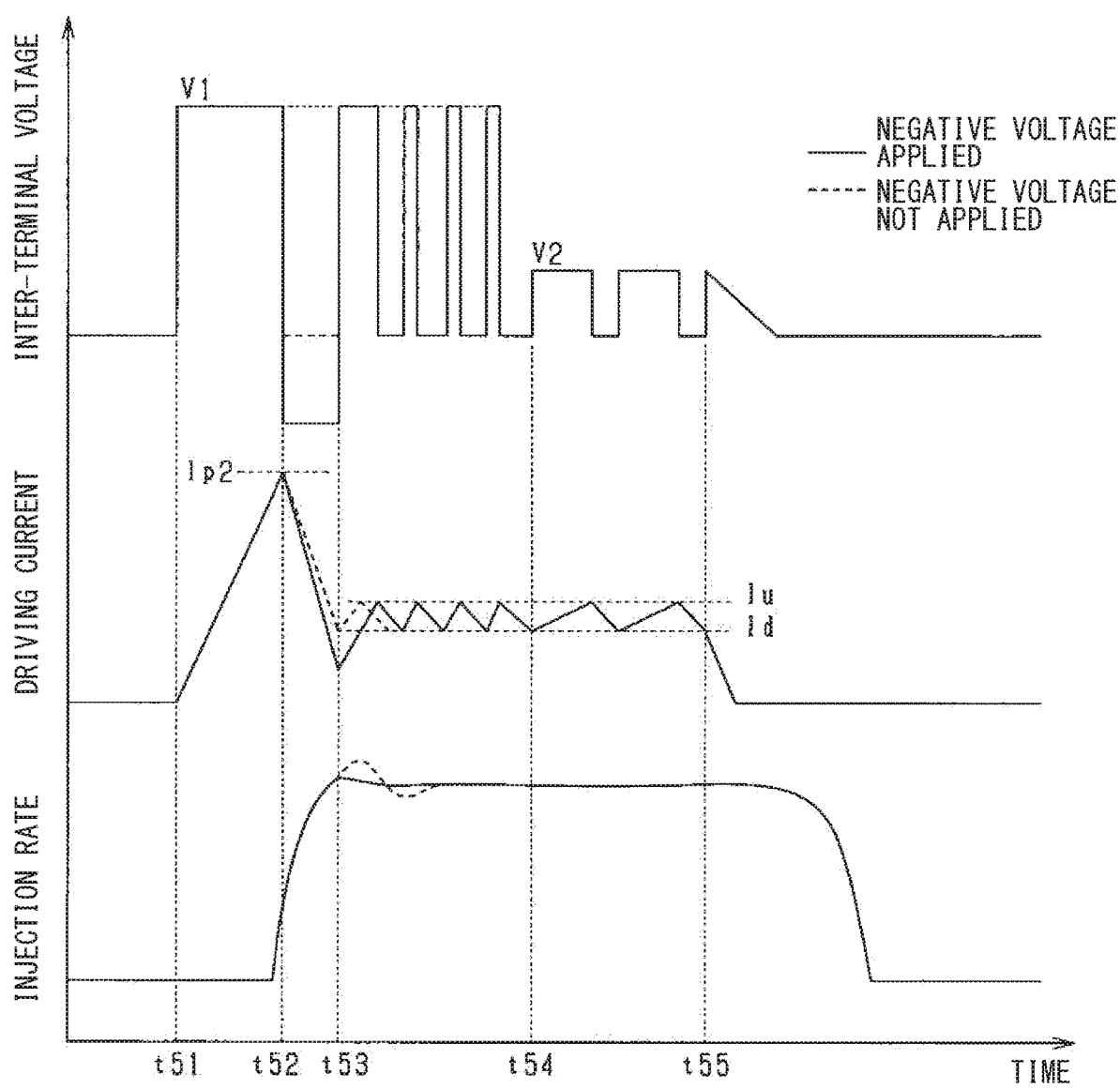
FIG. 23 is a time chart showing a modification of the control of the fuel injection valve.

As shown in FIG. 23, a configuration may be employable such that the microcomputer 41 stops the application of the high voltage V1 at time t52, subsequently applies a negative voltage to the coil 31 by time t53. According to this configuration, this configuration enables to quickly decelerate the needle 33 before arrival of the position of the needle 33 at the target position. Accordingly, this configuration enables to reduce the overshoot amount of the injection rate as indicated with a solid line, in comparison with a case where the negative voltage is not applied (broken line). In this configuration, by switching to and performing the second holding control, this configuration enables to restrict the driving current from becoming smaller than the target current, thus this configuration enables to restrict the needle 33 from moving toward the injection hole relative to the target position.

Figure 24:
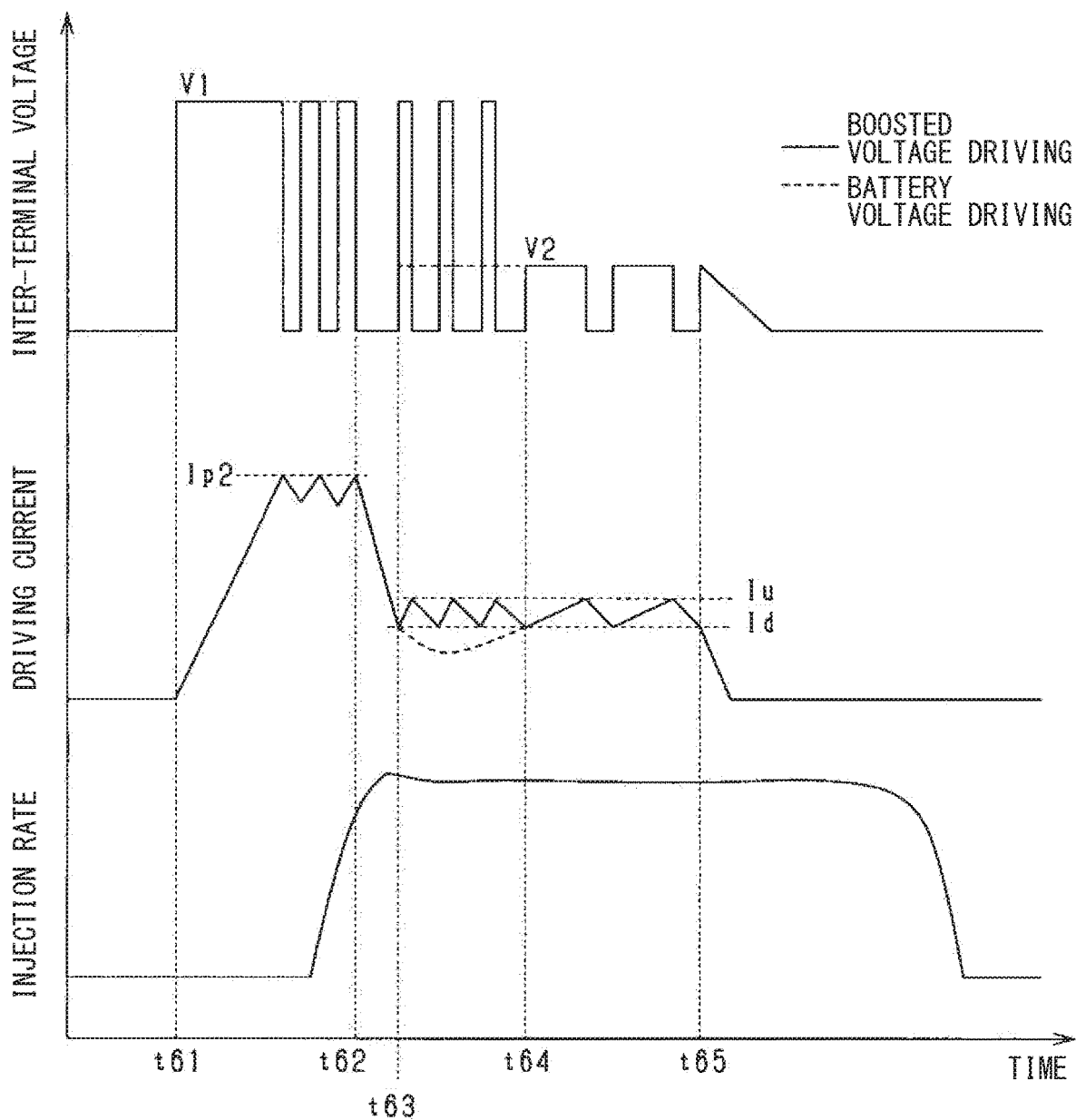
FIG. 24 is a time chart showing another modification of the control of the fuel injection valve.

As shown in FIG. 24, a configuration may be employable such that when the driving current has been increased to the target peak value Ip2 (peak value) plural times, the microcomputer 41 stops the application of the high voltage V1. Then the decrease in the driving current since the last increase in the driving current to the target peak value Ip2 may be suppressed with the second holding control.

Figure 25:
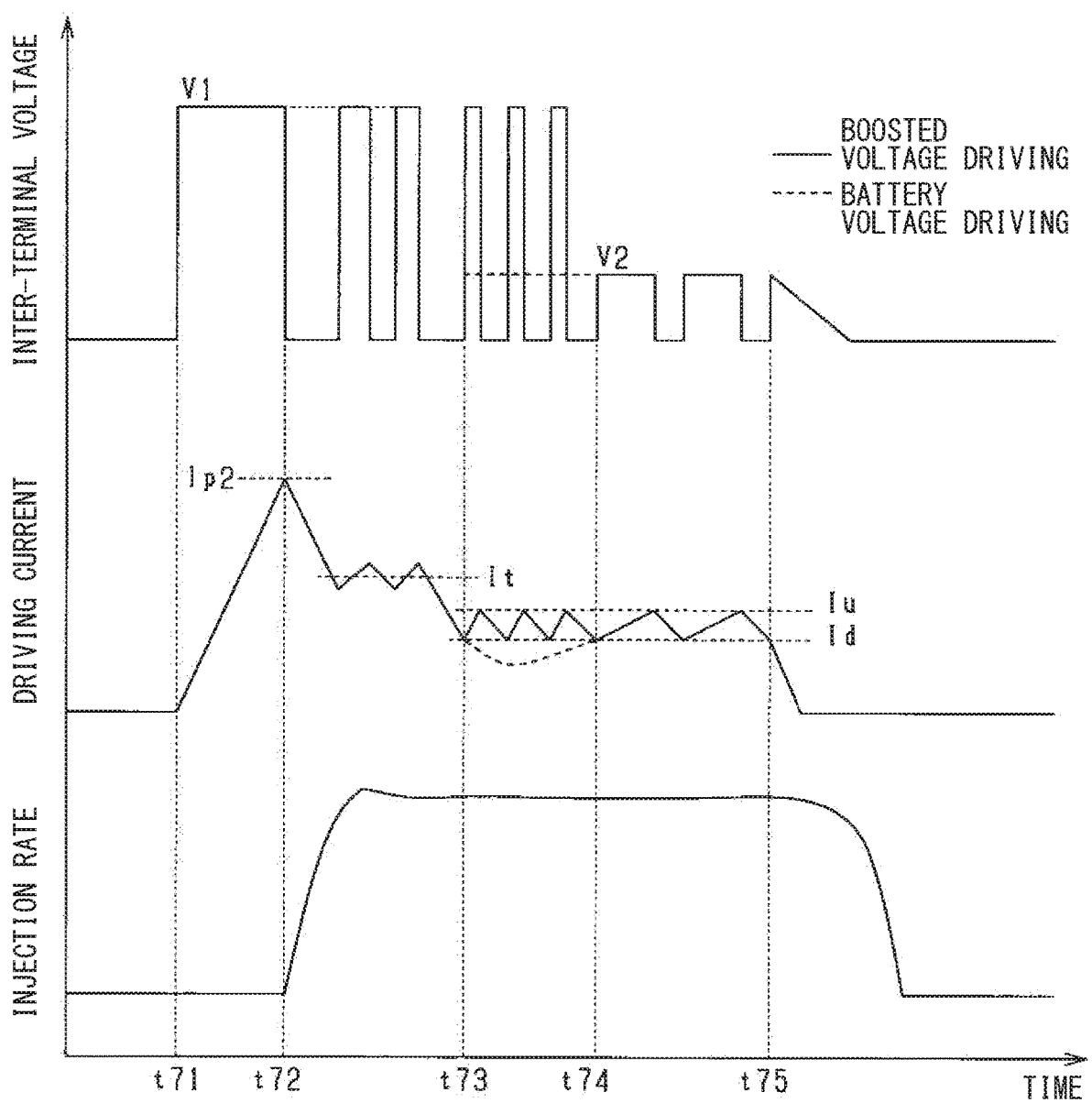
FIG. 25 is a time chart showing another modification of the control of the fuel injection valve.

As shown in FIG. 25, a configuration may be employable such that the microcomputer 41 increases the driving current to the target peak value Ip2 (peak value) at time t72, subsequently at time t73, before start of the control to hold the driving current between the upper limit value Iu and the lower limit value Id with the boosted voltage, the microcomputer 41 performs control to hold the driving current at a target value It (intermediate current) larger than the upper limit value Iu. The driving current is held at the target value It larger than the upper limit value Iu with the high voltage V1 here. Then, the decrease in the driving current upon switching of the target value of the driving current from the target value It to the upper limit value Iu and the lower limit value Id may be suppressed with the second holding control.

Figure 26:
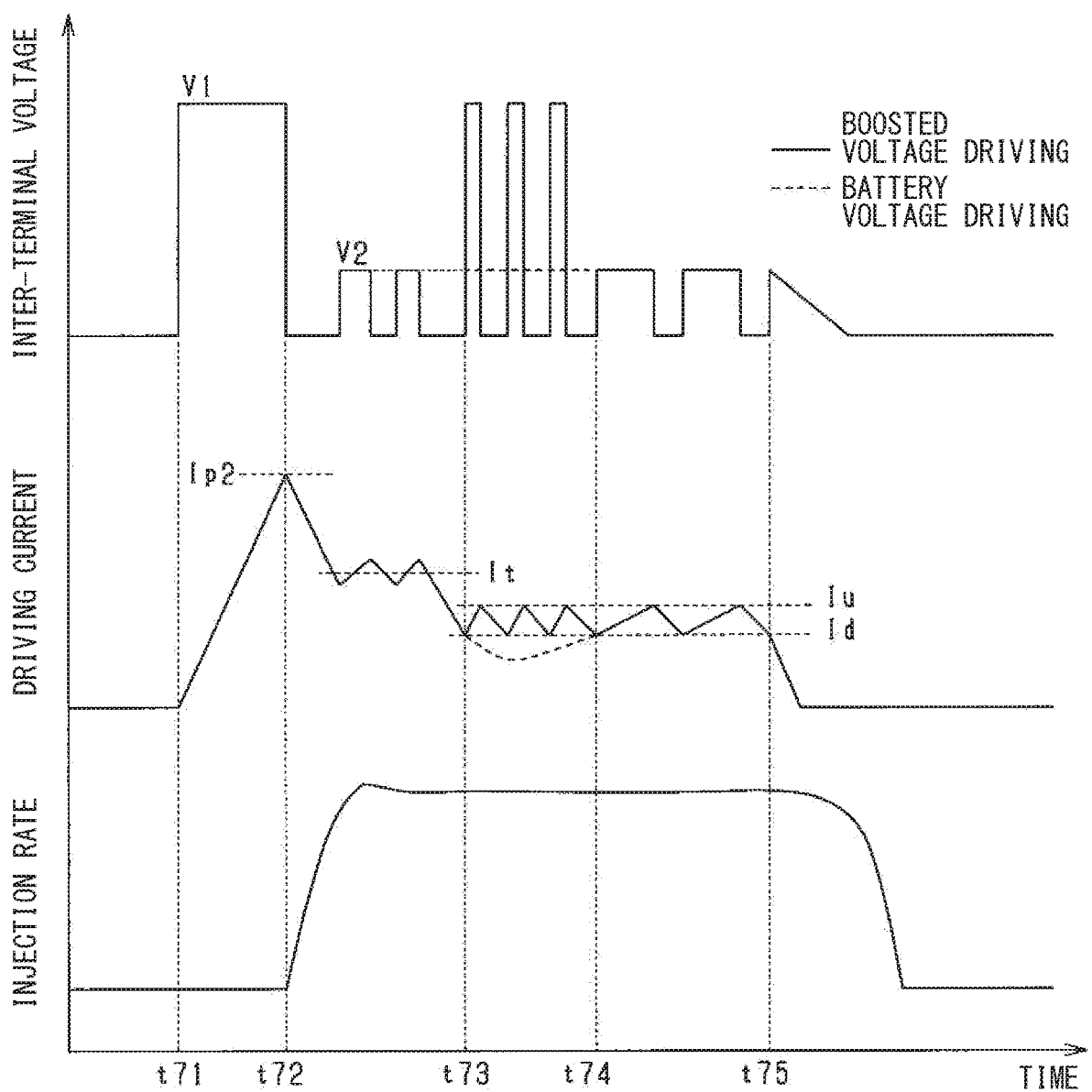
FIG. 26 is a time chart showing another modification of the control of the fuel injection valve.

As shown in FIG. 26, a configuration may be employable such that the microcomputer 41 increases the driving current to the target peak value Ip2 (peak value) at time t72, subsequently at t73, before the start of the control to hold the driving current between the upper limit value Iu and the lower limit value Id with the boosted voltage, performs the control to hold the driving current at the target value It larger than the upper limit value Iu.

The driving current is held at the target value It larger than the upper limit value Iu with the low voltage V2 here. Then, the decrease in the driving current upon switching of the target value of the driving current from the target value It to the upper limit value Iu and the lower limit value Id may be suppressed with the second holding control.

A configuration may be employable such that when the driving current is increased to the target peak value Ip1 (Ip2), the application of the high voltage V1 is stopped, subsequently the driving with the boosted voltage is started, and based on the lift amount of the needle 33 detected with a lift amount sensor, the driving with the boosted voltage is performed (continued) until occurrence of the counter electromotive force ceases in the coil 31. Further, a configuration may be employable such that regarding each fuel injection valve 30, time before occurrence of the counter electromotive force ceases in the coil 31 is previously acquired, and the driving time with the boosted voltage is set in accordance with a case where the time is the longest due to production variation or time variation of the fuel injection valve 30.

The minimum current Imn is not limited to the above-described abnormality determination value of the fuel injection valve 30, but may be set to a current value or the like with which the needle 33 may close the injection hole.

The drive IC 42, the voltage switching circuit 43, the low-voltage power supply unit 45, and the high-voltage power supply unit 46 may be provided outside of the ECU 40. Further, the control device of the fuel injection valve may have the functions of the microcomputer 41 and the drive IC 42, or may have the function of the ECU 40. That is, the control device of the fuel injection valve may include the microcomputer 41 and the drive IC 42, or may be configured with the ECU 40.

The present disclosure has been described in compliance with the embodiments, but the present disclosure is understood as not being limited to the embodiments and constructions. The present disclosure also encompasses variations in the various modifications and equivalents range. Additionally, various combinations and forms, furthermore, they only one component, more, or less, even other combinations and forms including, are intended to fall within the scope and spirit of the present disclosure.

What is claimed is:

1. A fuel injection valve control device configured to drive a fuel injection valve, which includes a valve body to open/close an injection hole to inject fuel and a coil to act a force in a direction to open the injection hole of the valve body on energization, with a driving circuit that is configured to switch between a first voltage and a second voltage lower than the first voltage and to apply one of the first voltage and the second voltage which is switched to the coil, the fuel injection valve control device comprising:
    an increase control unit configured to apply the first voltage with the driving circuit to the coil to increase a driving current that is an electric current to flow through the coil to a peak value; and
    a hold control unit configured
        to stop application of the first voltage with the driving circuit when the increase control unit increases the driving current to the peak value,
        subsequently to switch between
            a first holding control to apply the second voltage with the driving circuit to the coil based on the peak value to hold the driving current at a target current, and
            a second holding control to apply the first voltage with the driving circuit to the coil to hold the driving current at the target current, and
        to perform one of the first holding control and the second holding control which is switched.

2. The fuel injection valve control device according to claim 1, further comprising:
    a peak value setting unit configured to set the peak value based on the fuel pressure, wherein
    the hold control unit is configured
        to stop the application of the first voltage with the driving circuit, when the increase control unit increases the driving current to the peak value,
        subsequently to switch to and perform the second holding control, when the peak value set with the peak value setting unit is smaller than a predetermined current.

3. The fuel injection valve control device according to claim 1, wherein
    the second voltage is a voltage supplied from a battery, and
    the hold control unit is configured
        to stop the application of the first voltage with the driving circuit, when the increase control unit increases the driving current to the peak value,
        subsequently to switch between the first holding control and the second holding control based on the second voltage, and
        to perform one of the first holding control and the second holding control which is switched.

4. The fuel injection valve control device according to claim 1, further comprising:
    a peak value setting unit configured to set the peak value based on the fuel pressure, wherein
    the second voltage is a voltage supplied from a battery, and
    the hold control unit is configured
        to stop the application of the first voltage with the driving circuit when the increase control unit increases the driving current to the peak value,
        subsequently to switch to and perform the second holding control, when the peak value set with the peak value setting unit is smaller than a first predetermined current, or when the peak value set with the peak value setting unit is larger than the first predetermined current and is smaller than a second predetermined current larger than the first predetermined current and when the second voltage is lower than a predetermined voltage.

5. The fuel injection valve control device according to claim 1, further comprising:
    a peak value setting unit configured to set the peak value based on the fuel pressure, wherein
    the hold control unit is configured
        to stop the application of the first voltage with the driving circuit, when the increase control unit increases the driving current to the peak value,
        subsequently to switch to and perform the second holding control, when the fuel pressure is lower than a predetermined pressure.

6. A fuel injection valve control device configured to drive a fuel injection valve, which includes a valve body to open/close an injection hole to inject fuel and a coil to act a force in a direction to open the injection hole of the valve body on energization, with a driving circuit that is configured to switch between a first voltage and a second voltage lower than the first voltage and to apply one of the first voltage and the second voltage which is switched to the coil, the fuel injection valve control device comprising:

an increase control unit configured to apply the first voltage with the driving circuit to the coil to increase a driving current that is an electric current to flow through the coil to a peak value;

a hold control unit configured
to stop application of the first voltage with the driving circuit when the increase control unit increases the driving current to the peak value,
subsequently to switch between
a first holding control to apply the second voltage with the driving circuit to the coil based on at least one of the peak value, the second voltage, and a fuel pressure, to hold the driving current at a target current, and
a second holding control to apply the first voltage with the driving circuit to the coil to hold the driving current at the target current, and
to perform one of the first holding control and the second holding control which is switched; and a peak value setting unit configured to set the peak value based on the fuel pressure, wherein the hold control unit is configured
to stop the application of the first voltage with the driving circuit, when the increase control unit increases the driving current to the peak value,
subsequently to switch to and perform the second holding control, when the fuel pressure is lower than a predetermined pressure.

7. The fuel injection valve control device according to claim 1, wherein
the hold control unit is configured
to stop the application of the first voltage with the driving circuit, when the increase control unit increases the driving current to the peak value,
subsequently to start the second holding control based on at least one of the peak value, the second voltage, and the fuel pressure,
subsequently to control the second holding control until occurrence of a counter electromotive force ceases in the coil, and
to switch to and perform the first holding control, when occurrence of the counter electromotive force ceases in the coil.

8. A fuel injection valve control device configured to drive a fuel injection valve, which includes a valve body to open/close an injection hole to inject fuel and a coil to act a force in a direction to open the injection hole of the valve body on energization, with a driving circuit that is configured to switch between a first voltage and a second voltage lower than the first voltage and to apply one of the first voltage and the second voltage which is switched to the coil, the fuel injection valve control device comprising:

an increase control unit configured to apply the first voltage with the driving circuit to the coil to increase a driving current that is an electric current to flow through the coil to a peak value;

a hold control unit configured
to stop application of the first voltage with the driving circuit when the increase control unit increases the driving current to the peak value,
subsequently to switch between
a first holding control to apply the second voltage with the driving circuit to the coil based on at least one of the peak value, the second voltage, and a fuel pressure, to hold the driving current at a target current, and
a second holding control to apply the first voltage with the driving circuit to the coil to hold the driving current at the target current, and
to perform one of the first holding control and the second holding control which is switched, wherein
the hold control unit is configured
to stop the application of the first voltage with the driving circuit, when the increase control unit increases the driving current to the peak value,
subsequently to start the second holding control based on at least one of the peak value, the second voltage, and the fuel pressure,
subsequently to control the second holding control until occurrence of a counter electromotive force ceases in the coil, and
to switch to and perform the first holding control, when occurrence of the counter electromotive force ceases in the coil.

9. The fuel injection valve control device according to claim 1, wherein
the hold control unit is configured
to control the variation range of the driving current into a predetermined variation range, when holding the driving current at the target current in the first holding control, and
to control the variation range of the driving current into the predetermined variation range when holding the driving current at the target current in the second holding control.

10. A fuel injection valve control device configured to drive a fuel injection valve, which includes a valve body to open/close an injection hole to inject fuel and a coil to act a force in a direction to open the injection hole of the valve body on energization, with a driving circuit that is configured to switch between a first voltage and a second voltage lower than the first voltage and to apply one of the first voltage and the second voltage which is switched to the coil, the fuel injection valve control device comprising:

an increase control unit configured to apply the first voltage with the driving circuit to the coil to increase a driving current that is an electric current to flow through the coil to a peak value;

a hold control unit configured
to stop application of the first voltage with the driving circuit when the increase control unit increases the driving current to the peak value,
subsequently to switch between
a first holding control to apply the second voltage with the driving circuit to the coil based on at least one of the peak value, the second voltage, and a fuel pressure, to hold the driving current at a target current, and
a second holding control to apply the first voltage with the driving circuit to the coil to hold the driving current at the target current, and
to perform one of the first holding control and the second holding control which is switched, wherein
the hold control unit is configured
to control the variation range of the driving current into a predetermined variation range, when holding the driving current at the target current in the first holding control, and to control the variation range of the driving current into the predetermined variation range when holding the driving current at the target current in the second holding control.

11. The fuel injection valve control device according to claim 1, wherein the hold control unit is configured to stop the application of the first voltage with the driving circuit, when the increase control unit increases the driving current to the peak value, subsequently to switch between the first holding control and the second holding control and to perform one of the first holding control and the second holding control which is switched based on at least one of the peak value, the second voltage, and the fuel pressure, to cause the driving current to be larger than a minimum current set to be smaller than the target current.

12. A fuel injection valve control method to drive a fuel injection valve, which includes a valve body to open/close an injection hole to inject fuel and a coil to act a force in a direction to open the injection hole of the valve body on energization, with a driving circuit to switch between a first voltage and a second voltage lower than the first voltage and to apply one of the first voltage and the second voltage which is switched to the coil, the fuel injection valve control method comprising:

applying the first voltage with the driving circuit to the coil to increase a driving current that is an electric current to flow through the coil to a peak value;

stopping application of the first voltage with the driving circuit when the driving current increases to the peak value;

subsequently switching between a first holding control, which is to apply the second voltage with the driving circuit to the coil based on the peak value, to hold the driving current at a target current, and a second holding control, which is to apply the first voltage with the driving circuit to the coil, to hold the driving current at the target current; and performing one of the first holding control and the second holding control which is switched.

* * * * *